United States Patent
Otomo et al.

(10) Patent No.: US 9,929,898 B2
(45) Date of Patent: Mar. 27, 2018

(54) SYSTEM, COMMUNICATIONS NODE, AND SWITCHING METHOD

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 15/148,347

(22) Filed: May 6, 2016

(65) Prior Publication Data

US 2016/0254945 A1 Sep. 1, 2016

Related U.S. Application Data

(63) Continuation of application No. PCT/JP2013/080943, filed on Nov. 15, 2013.

(51) Int. Cl.
*H04L 12/24* (2006.01)
*H04L 12/947* (2013.01)
(Continued)

(52) U.S. Cl.
CPC ...... *H04L 41/0654* (2013.01); *H04L 41/0622* (2013.01); *H04L 41/0686* (2013.01);
(Continued)

(58) Field of Classification Search
None
See application file for complete search history.

(56) References Cited

U.S. PATENT DOCUMENTS

2004/0230638 A1  11/2004  Balachandran et al.
2011/0053493 A1  3/2011  Yanagihara
(Continued)

FOREIGN PATENT DOCUMENTS

JP  2004-336779  11/2004
JP  2009-86697   4/2009
(Continued)

OTHER PUBLICATIONS

International Search Report, mailed in connection with PCT/JP2013/080943 and dated Dec. 10, 2013 (1 page).

*Primary Examiner* — Chi H Pham
*Assistant Examiner* — Soon-Dong D Hyun
(74) *Attorney, Agent, or Firm* — Fujitsu Patent Center

(57) ABSTRACT

A sensor node among sensor nodes that synchronously switch between a first state and a second state transmits an abnormality notification signal to a collecting apparatus when in the first state and an abnormality occurs at the sensor node. The sensor node, when in the second state, transmits to the communications apparatus, a data signal that differs from the abnormality notification signal. During each interval of the first state, the sensor node enters a third state during a first partial interval of the interval of the first state, and receives and transfers an abnormality notification signal transmitted by another sensor node among the sensor nodes. During each interval of the first state, the sensor node further enters a fourth state during a second partial interval of the interval of the first state and different from the first partial interval, and refrains from receiving the abnormality notification signal.

8 Claims, 18 Drawing Sheets

(51) Int. Cl.
*H04W 52/02* (2009.01)
*H04W 4/00* (2018.01)
*H04W 4/04* (2009.01)
*H04W 84/18* (2009.01)

(52) U.S. Cl.
CPC ............ *H04L 49/25* (2013.01); *H04W 4/008* (2013.01); *H04W 4/046* (2013.01); *H04W 52/0203* (2013.01); *H04W 84/18* (2013.01); *Y02B 60/50* (2013.01)

(56) References Cited

U.S. PATENT DOCUMENTS

| | | | | |
|---|---|---|---|---|
| 2013/0016675 A1* | 1/2013 | Cha | ..................... | H04W 76/007 |
| | | | | 370/329 |
| 2013/0022018 A1* | 1/2013 | Jung | ....................... | H04W 4/06 |
| | | | | 370/329 |
| 2013/0042011 A1* | 2/2013 | Sugizaki | ............... | H04W 4/005 |
| | | | | 709/227 |
| 2014/0378081 A1* | 12/2014 | Xu | .................... | H04W 52/0251 |
| | | | | 455/404.1 |

FOREIGN PATENT DOCUMENTS

| | | |
|---|---|---|
| JP | 2009-206749 | 9/2009 |
| JP | 2011-49676 | 3/2011 |
| JP | 2011-176630 | 9/2011 |

* cited by examiner

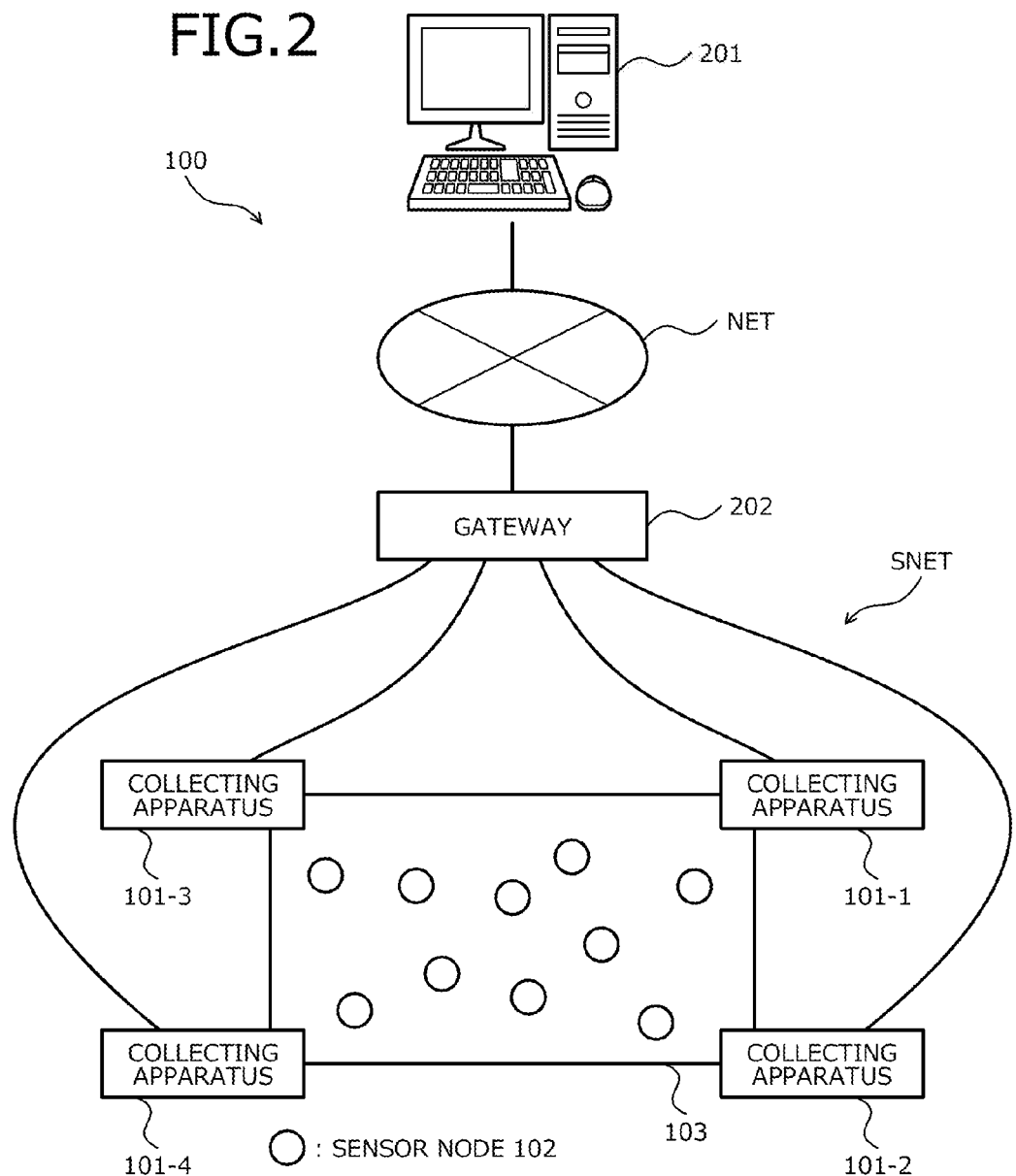

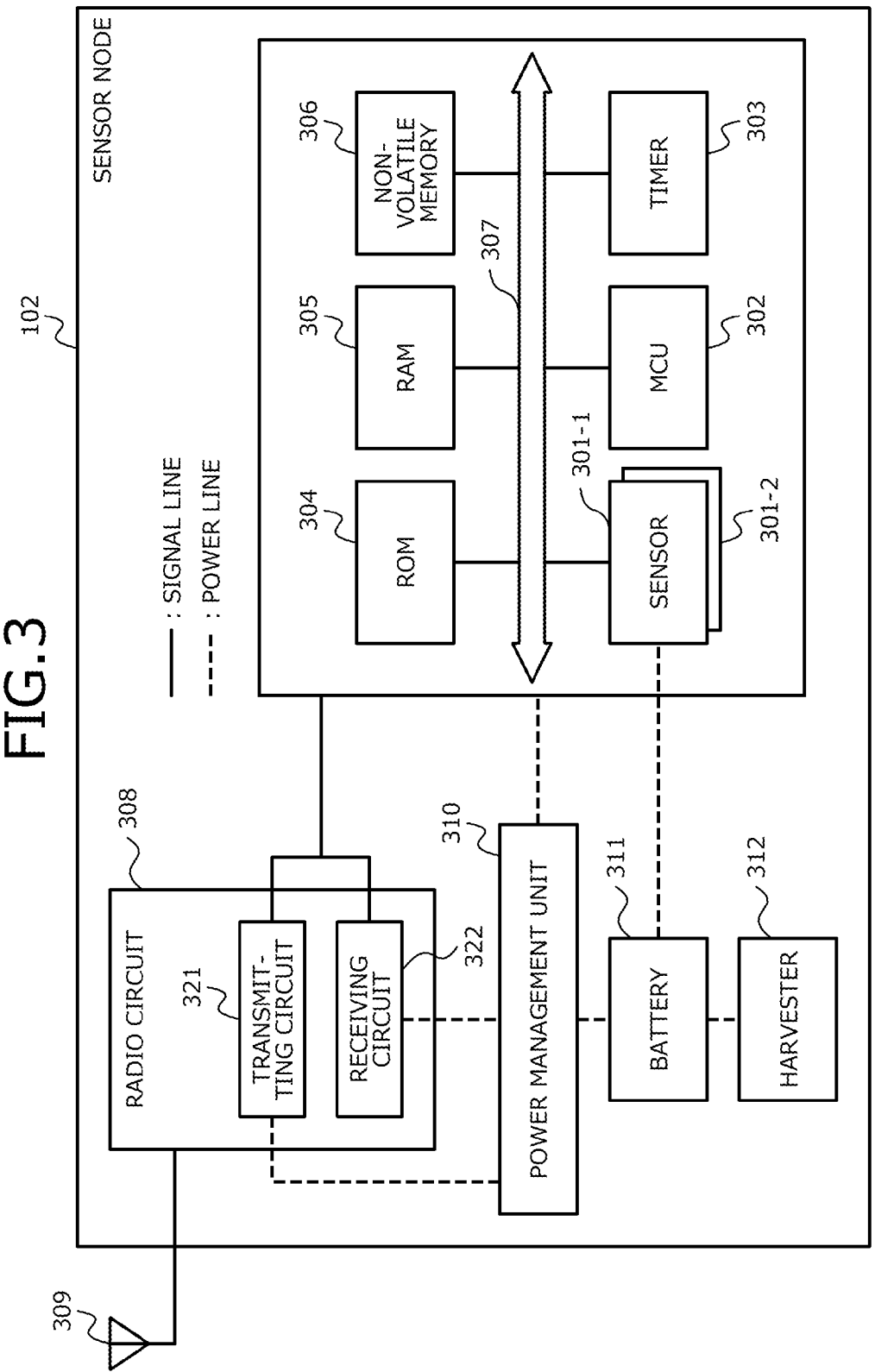

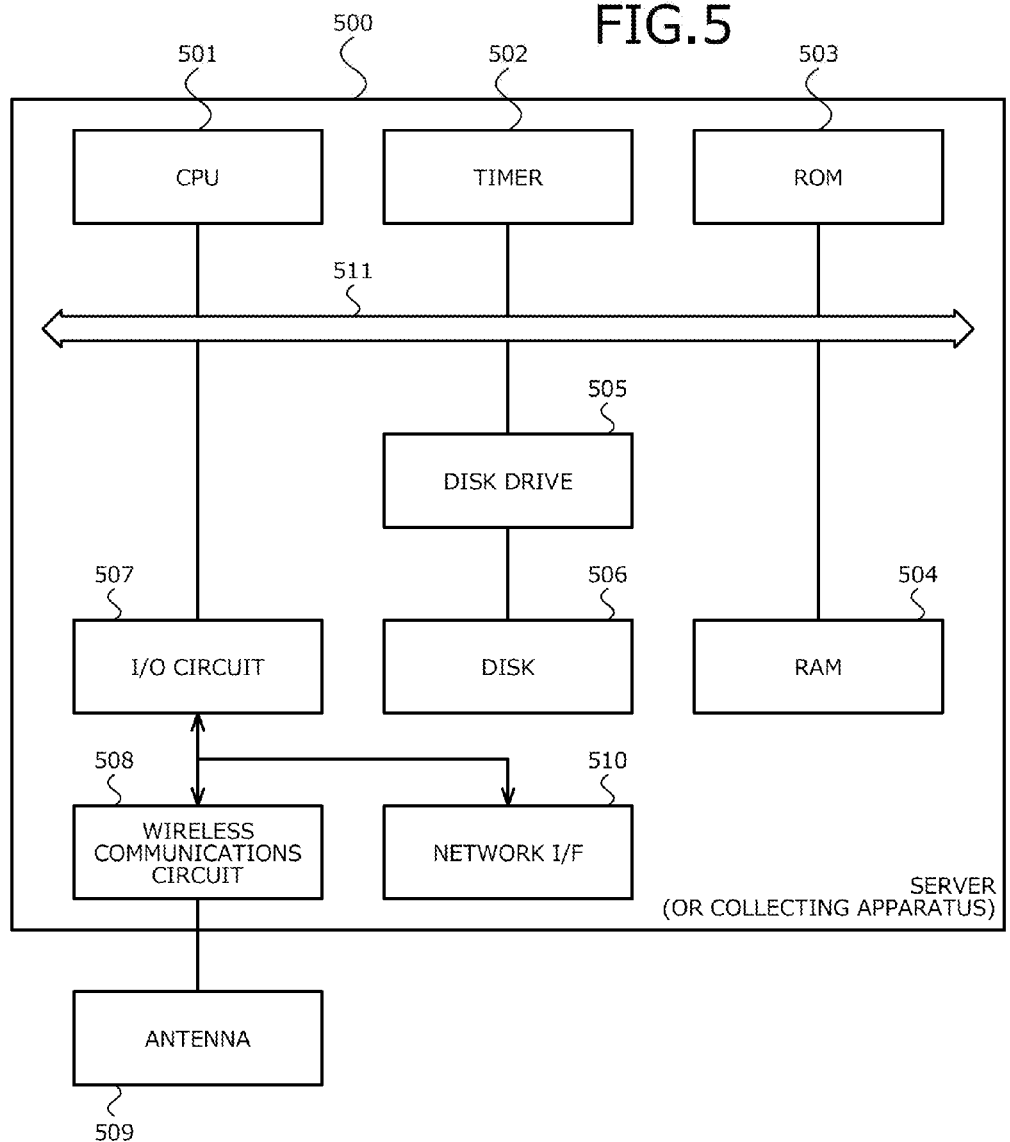

| STATES OF SENSOR NODE | MCU | RECEIVING CIRCUIT | SENSOR (FOR PERIODIC MEASUREMENT) | SENSOR (FOR EMERGENCY EVENTS) |
|---|---|---|---|---|
| ACTIVATION | ON | ON | ON | ON |
| SURVEILLANCE | SLEEP | ON | OFF | ON |
| SLEEP | SLEEP | OFF | OFF | ON |

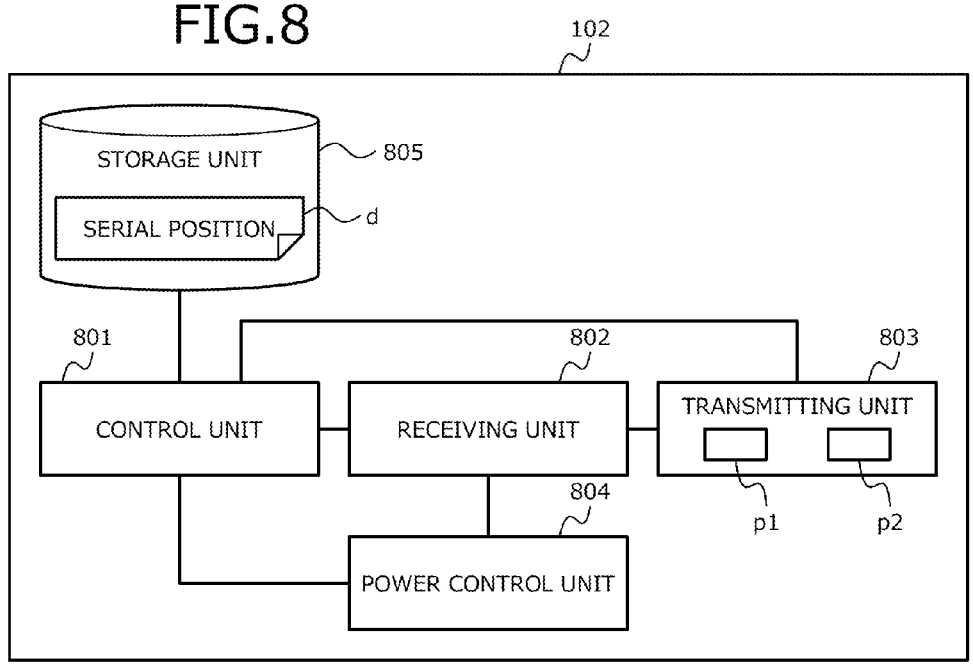
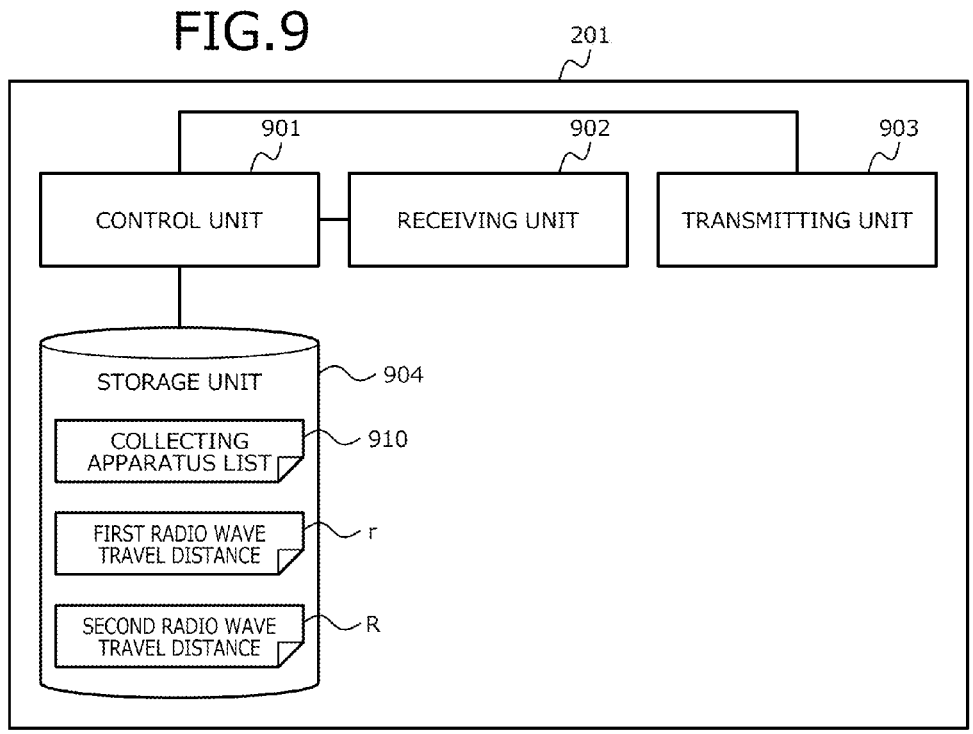

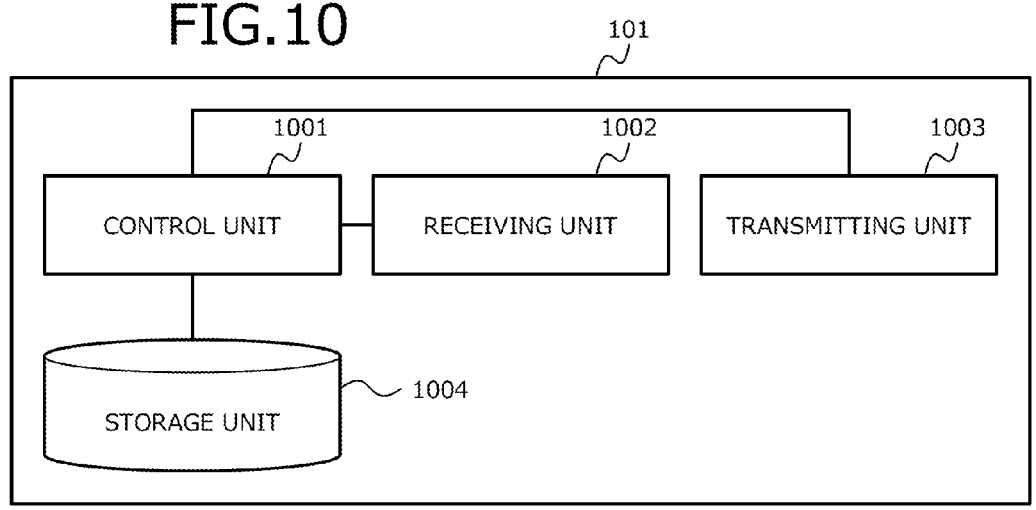

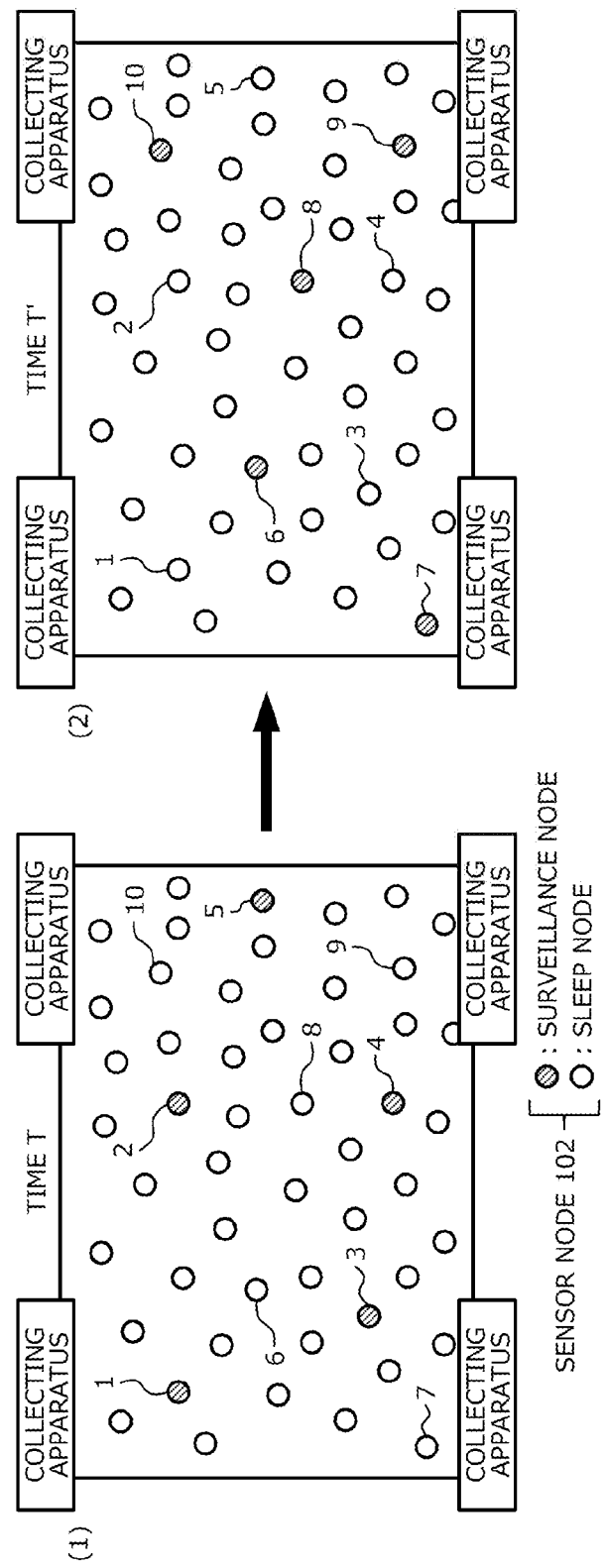

$n = [R/r]$ (GAUSS SYMBOL)

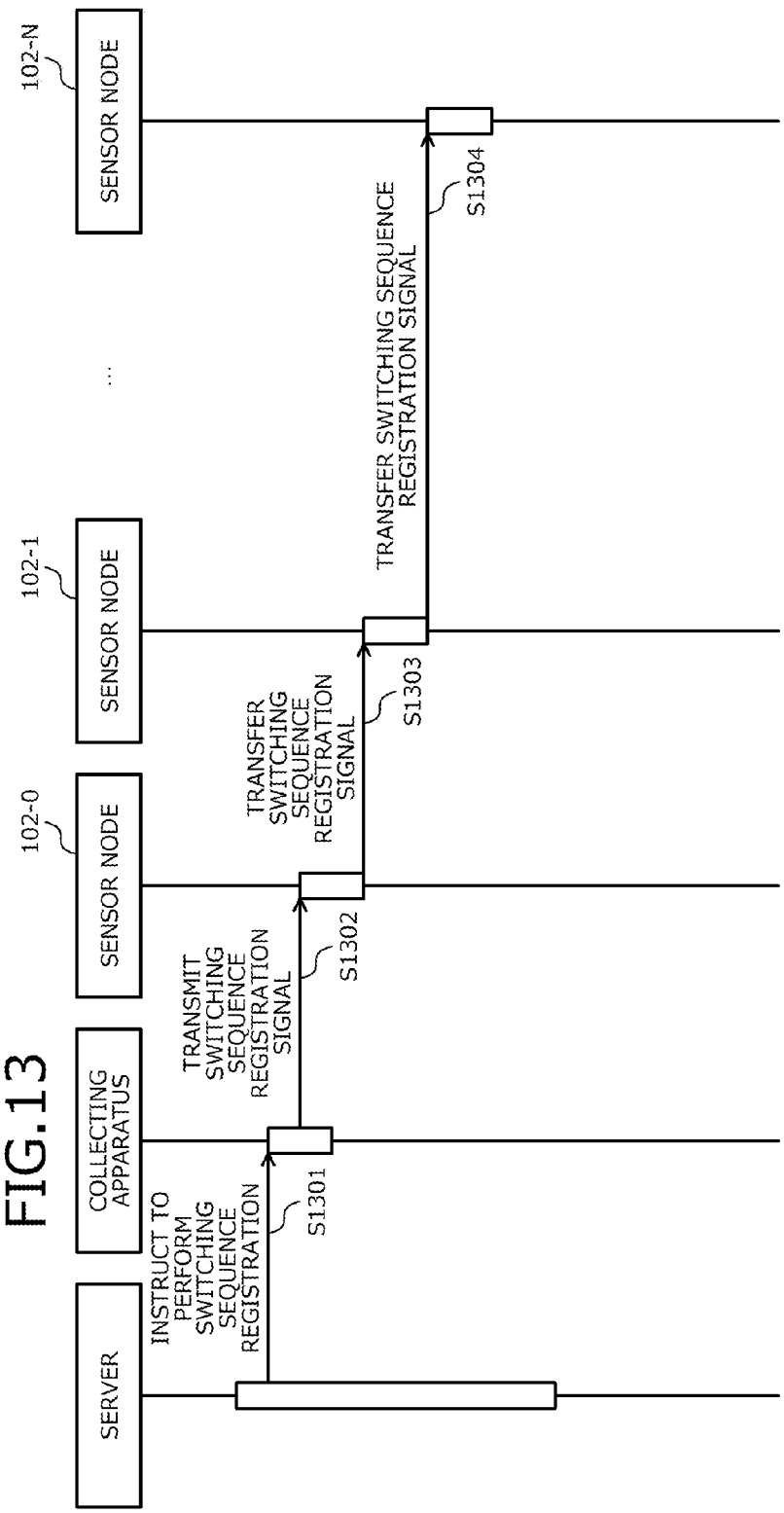

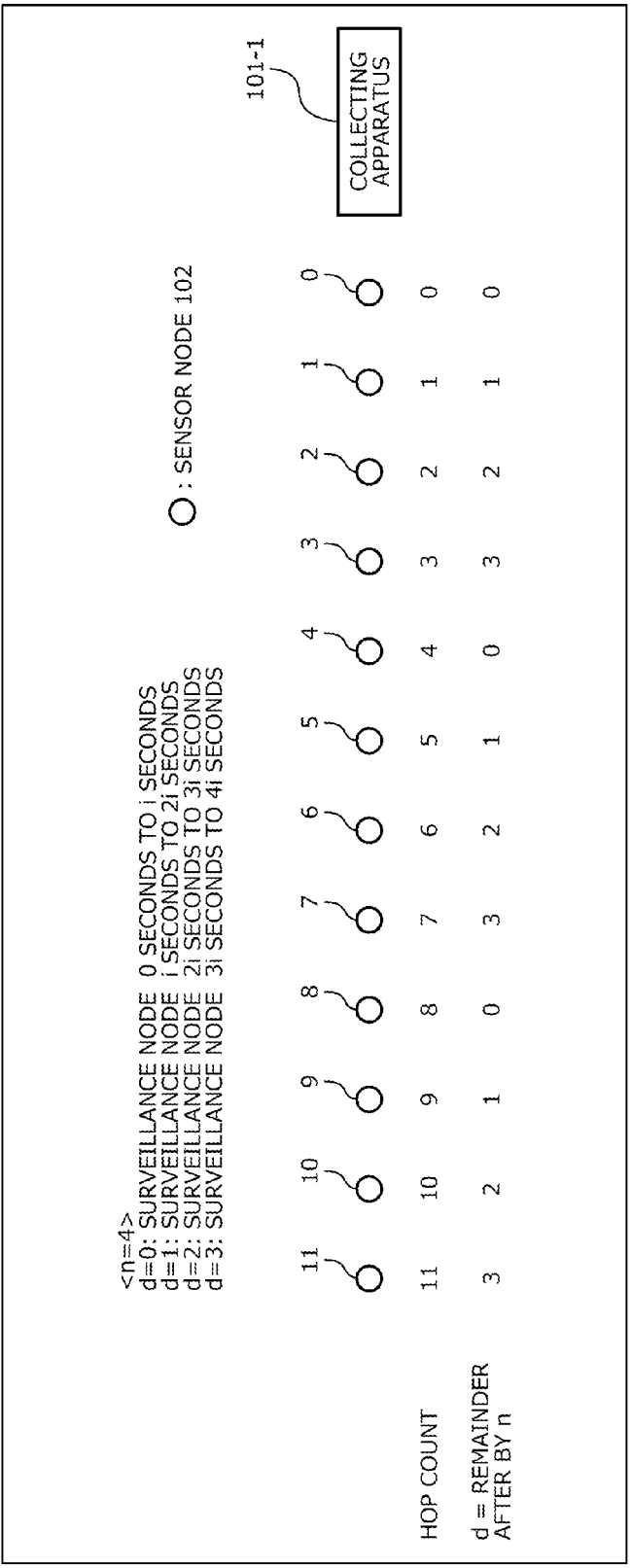

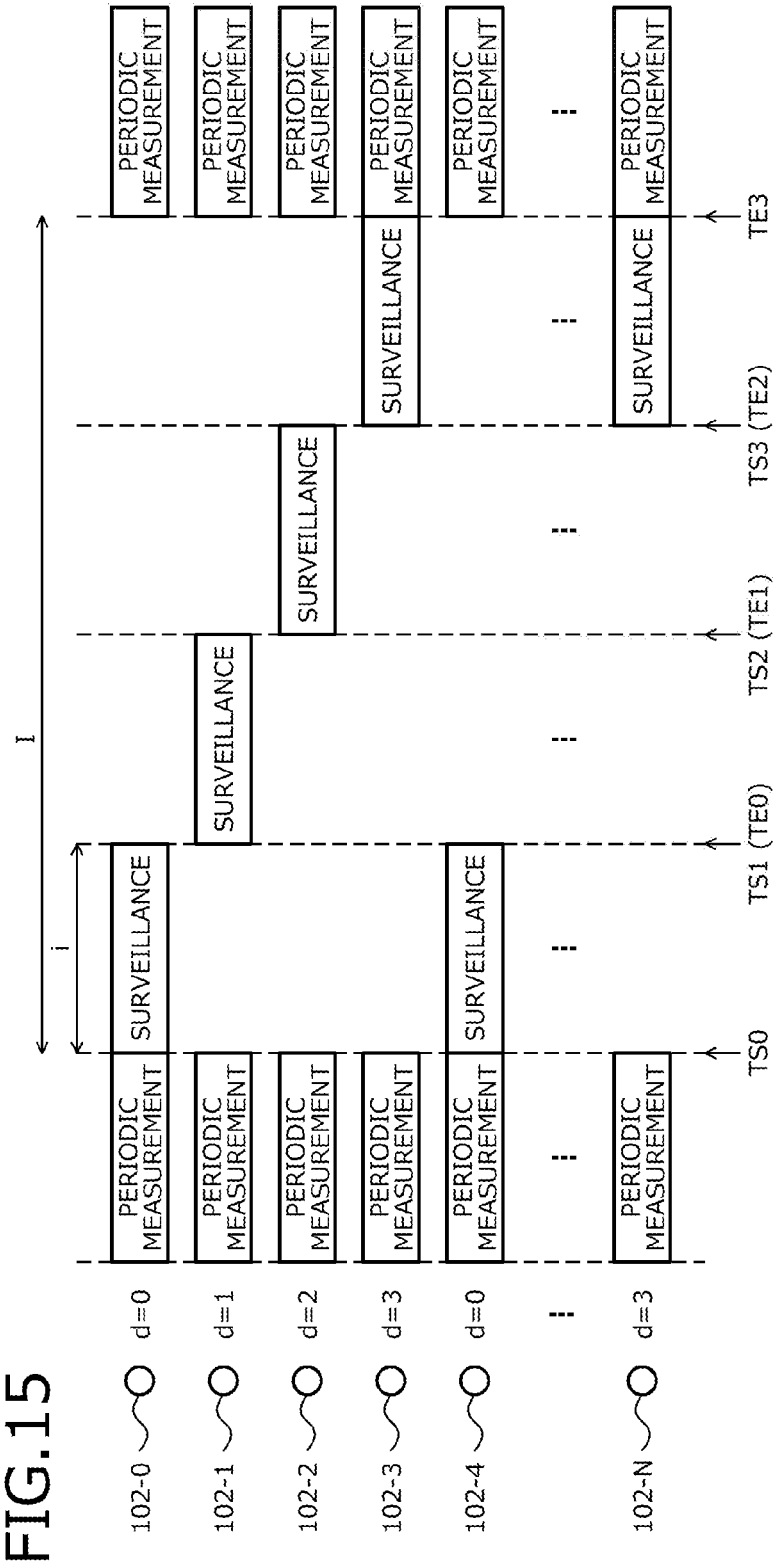

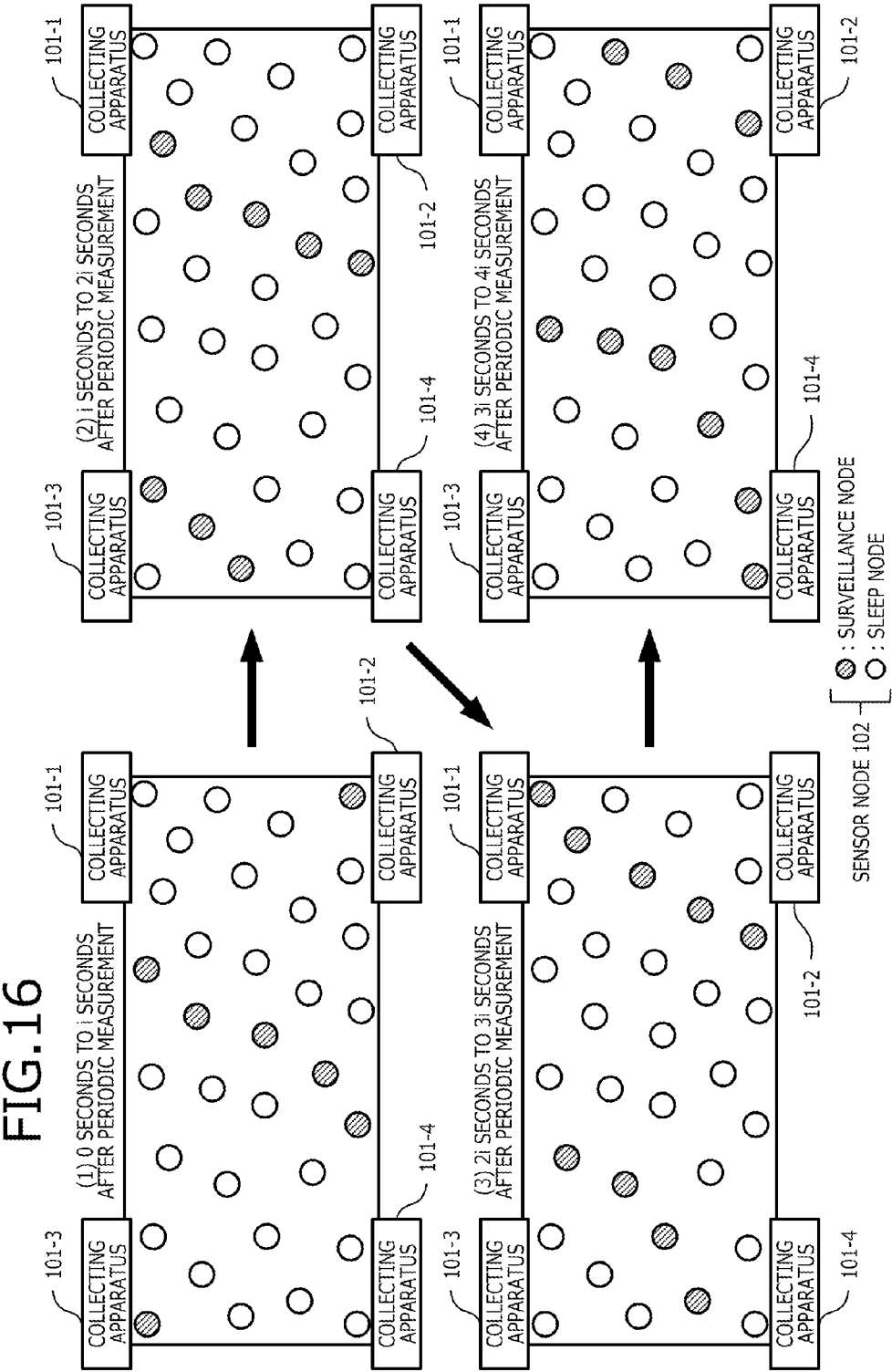

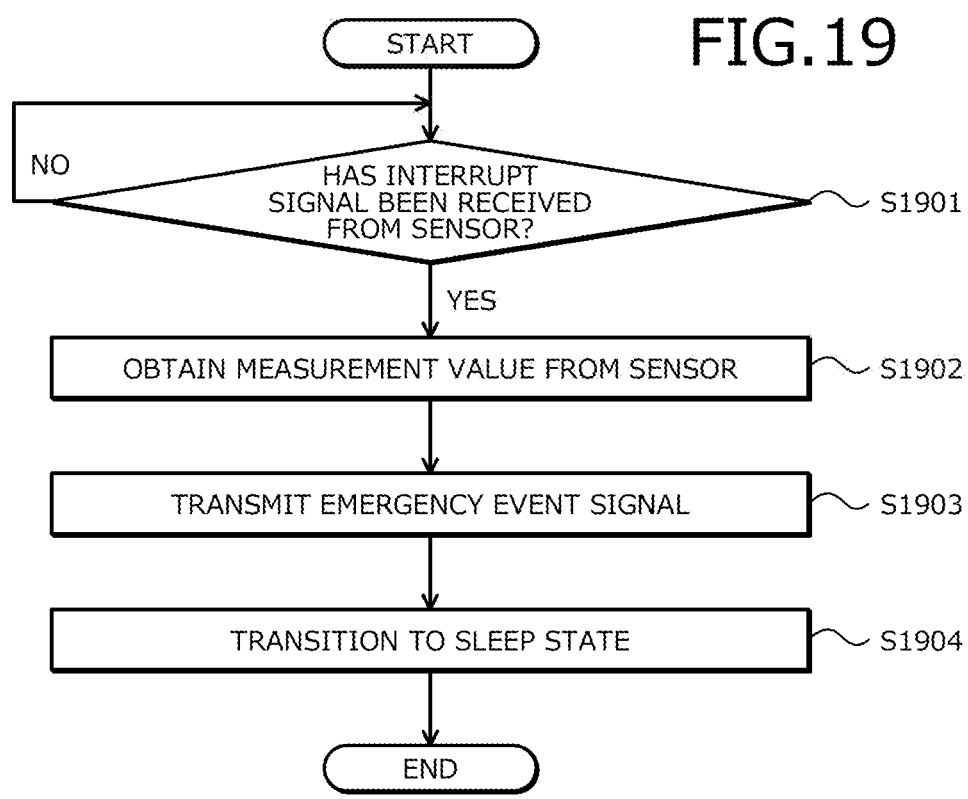

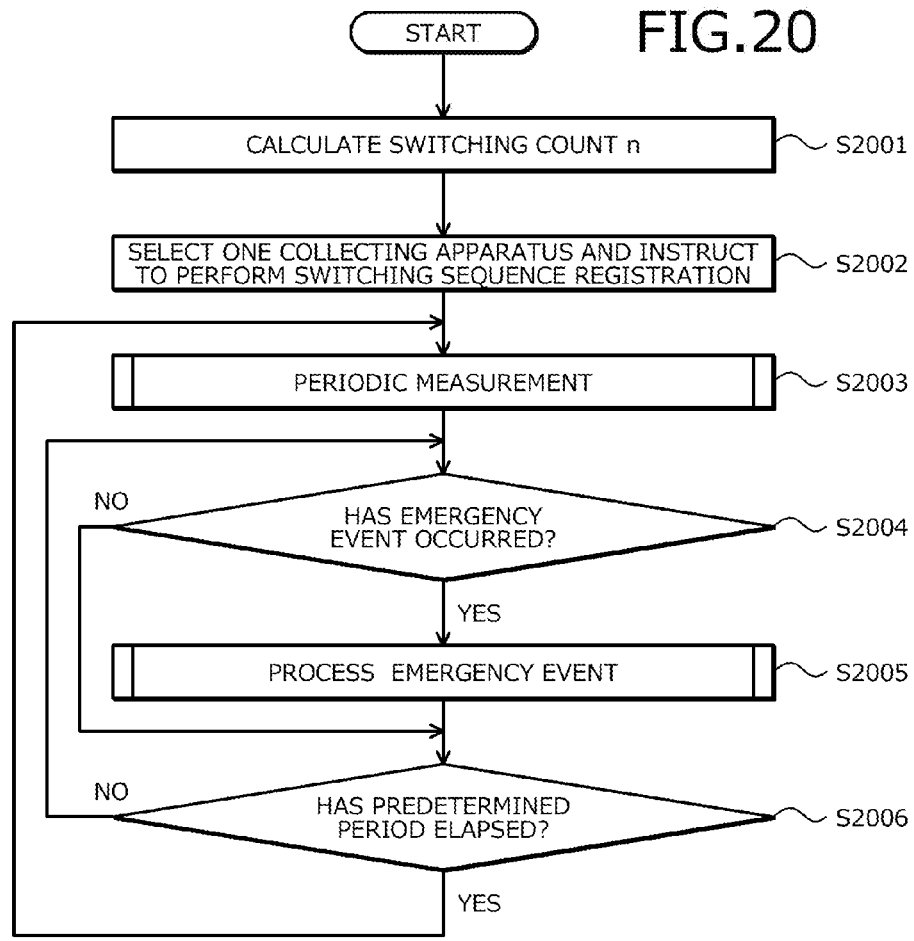
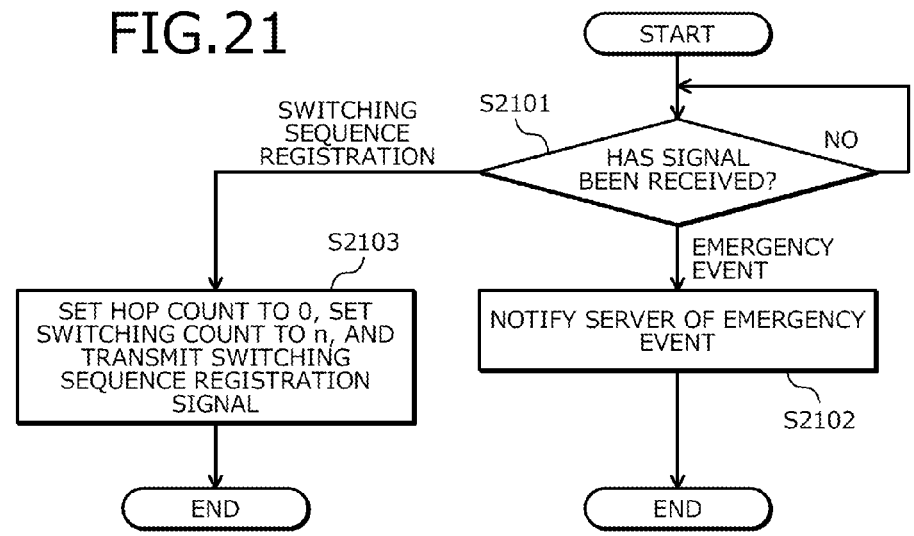

SYSTEM, COMMUNICATIONS NODE, AND SWITCHING METHOD

CROSS REFERENCE TO RELATED APPLICATIONS

This application is a continuation application of International Application PCT/JP2013/080943, filed on Nov. 15, 2013 and designating the U.S., the entire contents of which are incorporated herein by reference.

FIELD

The embodiments discussed herein are related to a system, a communications node, and a switching method.

BACKGROUND

In sensor network systems, numerous wireless sensor nodes detect changes in the environment of an area where the sensor nodes are disposed. Further, according to a commonly known technique, data is transmitted by relayed transfer through multihop communication among sensor nodes to a sensor node that is not directly connected.

According to a conventional technique, when relayed transfer is performed, information of whether a relay process is being performed with nearby sensor nodes is periodically exchanged. When no nearby node is performing a relay process, a reception function is continuously in an operating state and when a relay terminal is present, the reception function is in a sleep state excluding periodic reception intervals (for example, refer to Japanese Laid-Open Patent Publication No. 2011-49676). Thus, an aggregation process is performed by a portion of the sensor nodes.

According to another conventional technique, to reduce power consumption, an interval for the sleep state is determined based on remaining energy information and sleep information of adjacent nodes (for example, refer to Japanese Laid-Open Patent Publication No. 2004-336779).

According to another conventional technique, in a sensor network that transfers data by multihop communication, terminals are grouped according to distance from a base station and set to be in the sleep state except when communicating at constant intervals. When a terminal detects emergency information, the cycle at which information is sent is shorted (for example, refer to Japanese Laid-Open Patent Publication No. 2009-86697).

Nonetheless, with the conventional techniques, a problem arises in that, for example, when the sensor nodes are operated intermittently, to enable the sensor nodes to give notification of a detected abnormality even during an idle period, reception circuits of the sensor nodes are in operation during the idle period and consequently power consumption becomes great.

SUMMARY

According to an aspect of an embodiment, a system includes a communications apparatus; and communications nodes that synchronously switch between a first state and a second state. When a first communications node among the communications nodes is in the first state and an abnormality occurs at the first communications node, the first communications node transmits to the communications apparatus, a first abnormality notification signal that gives notification that the abnormality occurred, and when in the second state, the first communications node transmits to the communications apparatus, a data signal that differs from the first abnormality notification signal. The first communications node, during each interval of the first state, enters a third state during a first partial interval that is included in the interval of the first state. The first communications node when in the third state, receives a second abnormality notification signal transmitted from a second communications node among the communications nodes and transfers the second abnormality notification signal. The first communications node, during each interval of the first state, enters a fourth state during a second partial interval that differs from the first partial interval and is included in the interval of the first state. The first communications node when in the fourth state, refrains from receiving the second abnormality notification signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram of an example of the system;

FIG. 3 is a block diagram of an example of hardware configuration of a sensor node 102;

FIG. 5 is a block diagram of an example of hardware configuration of a server 201 and a collecting apparatus 101;

FIG. 8 is a diagram of an example of a functional configuration of the sensor node 102;

FIG. 9 is a diagram of an example of a functional configuration of the server 201;

FIG. 10 is a diagram of an example of a functional configuration of the collecting apparatus 101;

FIG. 11 is a diagram of an example of switching;

FIG. 13 is a sequence diagram of an example of transfer of a switching sequence registration signal;

FIG. 14 is a diagram of an example of hop counts and registered serial positions;

FIG. 15 is a diagram of periodic measurement and a surveillance period;

FIG. 16 is a diagram of a transition example of a surveillance node after periodic measurement;

FIG. 19 is a flowchart of an example of a process procedure performed by the sensor node 102 when an emergency event occurs;

FIG. 20 is a flowchart of an example of a process procedure performed by the server 201; and FIG. 21 is a flowchart of an example of a process procedure performed by the collecting apparatus 101.

DESCRIPTION OF EMBODIMENTS

Embodiments of a system, a communications node, and a switching method will be described in detail with reference to the accompanying drawings.

Figure 1:
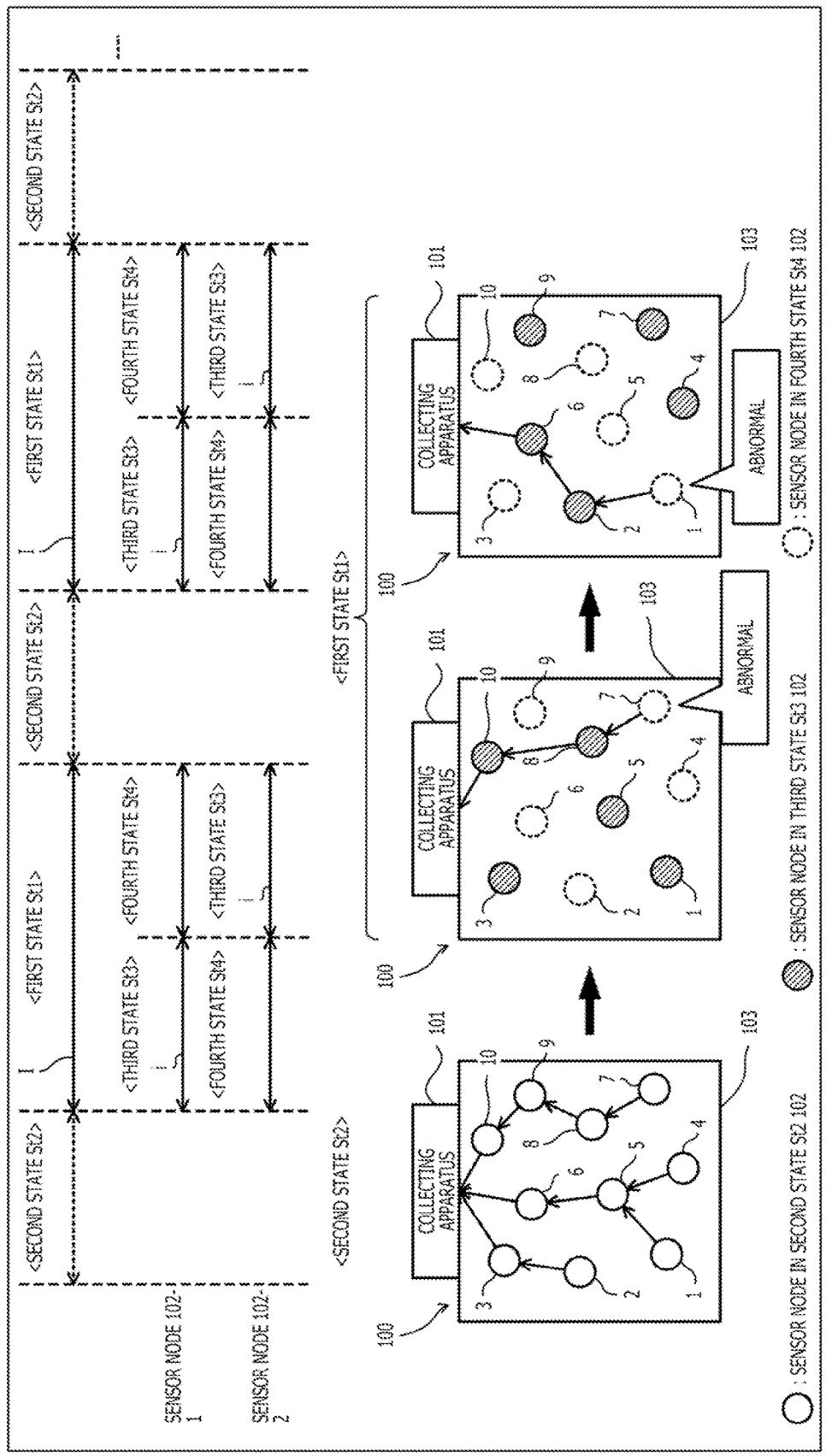
FIG. 1 is a diagram of an example of operation of a system according to the present invention.

FIG. 1 is a diagram of an example of operation of the system according to the present invention. A system 100 is a sensor network system in which sensor nodes 102 that have sensors and small-scale wireless communications circuits configure a sensor network and the sensor network system collects data of the sensors. The system 100 includes the sensor nodes 102 and collecting apparatuses 101. A sensor node 102 is a radio communications node that has a sensor and is disposed in an installation area 103. For example, the sensor node 102 stores internally generated electrical power to a battery. Each collecting apparatus 101 is a communications apparatus that collects sensor data from the sensor nodes 102. An example of the system 100 will be described in detail with reference to FIG. 2.

The sensor nodes 102 synchronously switch between a first state St1 and a second state St2. For example, the first state St1 is a state where at a sensor node 102, a particular abnormality occurs and the sensor node 102 transmits to a collecting apparatus 101, an abnormality notification signal that gives notification of the occurrence of the abnormality. A particular abnormality, for example, is an abnormality that has a high degree of urgency such as an acute change in the environment of the installation area 103. Herein, an abnormality notification signal, for example, is referred to as an emergency event signal. The second state St2 is a state where the sensor nodes 102 transmit to the collecting apparatuses 101, a data signal that differs from an emergency event signal. In this example, the destination of the emergency event signal and the destination of the data signal are the same, the collecting apparatus 101. However, the respective signals may have differing destinations.

Figure 4A:
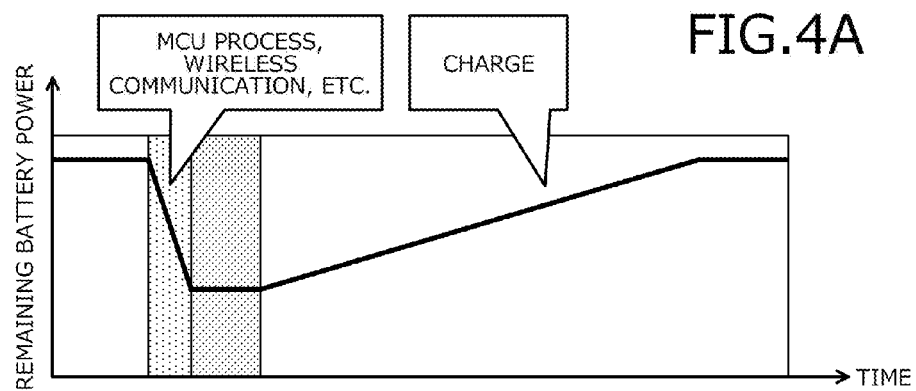
FIGS. 4A and 4B are diagrams depicting an example of assumed operation of the sensor nodes 102.
Figure 4B:
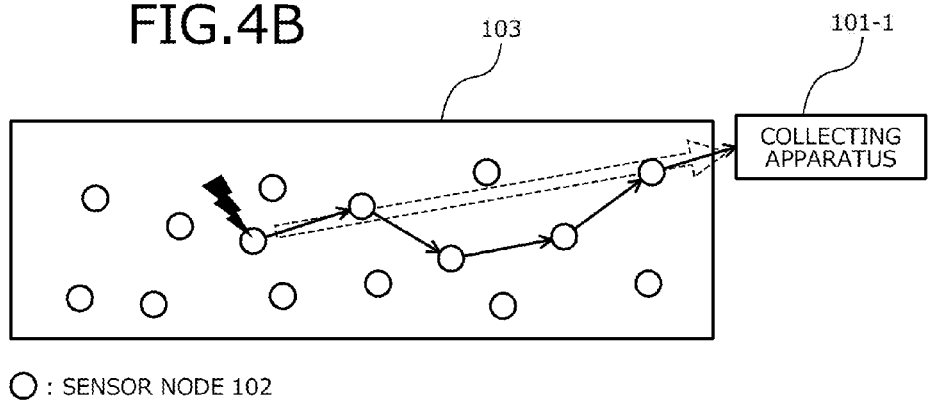

The second state St2 is an activated state in which power is supplied to each component of the sensor node 102. More specifically, the second state St2 is a state where the sensor node 102 performs measurement by the sensor of the sensor node 102, and transmits to a communications apparatus, a data signal that gives notification of the measurement value. Further, in the second state St2, the sensor node 102 transfers data signals transmitted from other sensor nodes 102. In this example, processing during the second state St2 will be referred to as periodic measurement. Since the sensor nodes 102 operate intermittently as depicted in FIGS. 4A and 4B, the electrical power of the battery is significantly depleted by data transmission and measurement during the second state St2. Thus, in the present embodiment, each sensor node 102 charges the battery thereof during an interval I of the first state St1.

The sensor node 102, during each interval I of the first state St1, enters a third state St3 during a partial interval i that is included in the interval I of the first state St1. The third state St3 is a state where the sensor node 102 receives an emergency event signal transmitted from another sensor node 102 among the sensor nodes 102 and transfers the received emergency event signal. Further, the sensor node 102, during each interval I of the first state St1, enters a fourth state St4 of not receiving an emergency event signal during an interval that differs from the partial interval i and is included in the interval I of the first state St1. The third state St3 is a surveillance state described hereinafter and the fourth state St4 is a sleep state described hereinafter.

For example, the third state St3 is a state where power is supplied to a receiving unit of the sensor node 102; and the fourth state St4 is a state where power is not supplied to the receiving unit. Thus, in the third state St3, the sensor node 102 is set to receive an emergency event signal and in the fourth state St4, the sensor node 102 is set to not receive an emergency event signal.

The sensor nodes 102 transmit data signals by a first transmission power. The sensor nodes 102 transmit emergency event signals by a second transmission power that is greater than the first transmission power. As a result, even when fewer sensor nodes 102 are operating, emergency event signals can be transmitted farther, enabling emergency event signals to reach the collecting apparatus 101 by fewer transfers.

A first rate of the length of the partial interval i and the length of the interval that differs from the partial interval i is a value that corresponds to a second rate of an emergency event signal travel distance by the second transmission power and a data signal travel distance by the first transmission power. The second rate is a switching count n described hereinafter. In the example depicted in FIG. 1, if the emergency event signal travel distance is twice the data signal travel distance, the second rate is 2. Therefore, the first rate is 1/second rate; and the length of the partial interval i is set as the length of the interval I of the first state St1/second rate. As a result, since the sensor nodes 102 are in the third state St3 for a shorter interval, power consumption can be reduced.

Each sensor node 102, before operation, determines the start time of the partial interval i by the first rate and a hop count for a signal transmitted from the collecting apparatus 101 to reach the sensor node 102.

For example, the sensor node 102-1 enters the third state St3 after the second state St2. The sensor node 102-1 enters the fourth state St4 after the third state St3. Subsequently, the sensor node 102-1 again enters the second state St2 after the fourth state St4. In this manner, the sensor node 102-1 sequentially switches states in the order of the second state St2, the third state St3, the fourth state St4. Further, the sensor node 102-3, the sensor node 102-5, the sensor node 102-8, and the sensor node 102-10 follow state transition similar to the sensor node 102-1.

For example, the sensor node 102-2 enters the fourth state St4 after the second state St2. The sensor node 102-2 enters the third state St3 after the fourth state St4. Subsequently, the sensor node 102-2 again enters the second state St2 after the third state St3. In this manner, the sensor node 102-2 sequentially switches states in the order of the second state St2, the fourth state St4, the third state St3. Further, the sensor node 102-4, the sensor node 102-6, the sensor node 102-7, and the sensor node 102-9 follow state transition similar to the sensor node 102-2.

FIG. 2 is a diagram of an example of the system. In the system 100, changes in the environment of the installation area 103 where the sensor nodes 102 are disposed are detected by, for example, collection of measurement values obtained by the wireless sensor nodes 102.

More specifically, the system 100 includes a server 201, a gateway 202, the collecting apparatuses 101, and the sensor nodes 102. The server 201 and the gateway 202 are connected through a network NET such as the Internet. Although not depicted, each apparatus may be connected to a user terminal through the network NET.

The server 201, for example, collects, accumulates, and analyzes measurement values, and governs overall control of the system 100, including the gateway 202, the collecting apparatuses 101, the sensor nodes 102, etc. The gateway 202 relays signals exchanged between the network NET to which the server 201 and user terminal are connected, and a sensor network SNET configured by the sensor nodes 102 and the collecting apparatuses 101. For example, the collecting apparatuses 101 communicate with the sensor nodes 102 to collect measurement values and notify the server 201 of collection results. Further, the collecting apparatuses 101, for example, may give instructions to the sensor nodes 102. The sensor nodes 102 are communications nodes that measure a state at respective positions in the installation area 103. Further, the sensor nodes 102 are configured to wirelessly communicate with nearby sensor nodes 102 and the collecting apparatuses 101.

FIG. 3 is a block diagram of an example of hardware configuration of a sensor node 102. A sensor node 102 has a sensor 301, a micro control unit (MCU) 302, a timer 303, read-only memory (ROM) 304, random access memory (RAM) 305, and non-volatile memory 306. The sensor node 102 further has a radio circuit 308, an antenna 309, a power management unit 310, a battery 311, and a harvester 312. The sensor node 102 further has an internal bus 307 that connects the sensor 301, the MCU 302, the timer 303, the ROM 304, the RAM 305, and the non-volatile memory 306. In FIG. 3, dotted lines represent power lines and solid lines represent signal lines.

The sensor 301 detects a particular change at the installation site. The sensor 301, for example, may be a piezoelectric device that detects voltage at the installation site, a device that detects temperature, a photoelectric device that detects light, and the like. As depicted in FIG. 3, various types of the sensor 301 may be disposed. Measurement timings may be separated according to function such as the sensor 301-1 for periodic measurement and the sensor 301-2 for emergency events. At a periodic measurement, the sensor nodes 102 perform measurement by the sensor 301-1 at predetermined first intervals and notify the collecting apparatus 101 of the measurement value. In a measurement for an emergency event, the sensor nodes 102 perform measurement by the sensor 301-2 at predetermined second intervals, which are shorter than the predetermined first interval, and determine whether an abnormality is present from the measurement value. When determining that an abnormality is present in a measurement for an emergency event, the sensor nodes 102 urgently notify the collecting apparatuses 101 that an abnormality has occurred.

The MCU 302, for example, is a control unit that loads a program stored in the ROM 304 onto the RAM 305 and executes the program to thereby control the sensor node 102 overall and perform data processing. For example, the MCU 302 processes data obtained by the sensor 301. The timer 303, for example, measures a period set by the MCU 302. In the present embodiment, for example, the timer 303 measures a sensing interval for spontaneous sensing by the sensor 301. Further, for example, the timer 303, in a second example described hereinafter, measures a predetermined interval for suspending a near field communications circuit.

The ROM 304 is a storage unit that stores therein programs executed by the MCU 302. The RAM 305 is a storage unit that stores transient data of processes at the MCU 302. The non-volatile memory 306 is a storage unit that is writable memory and that retains predetermined data written thereto even when power supply ceases. For example, the writable non-volatile memory 306 may be flash memory. In the storage units such as the ROM 304 and the non-volatile memory 306, for example, a serial position and the like are stored.

The antenna 309 transmits and receives radio waves wirelessly communicated with other sensor node 102 and the gateway 202. For example, the radio circuit 308 is a radio frequency (RF) circuit. The radio circuit 308 has a reception circuit 322 that outputs as a received signal, radio waves received through the antenna 309, and a transmission circuit 321 that transmits through the antenna 309, a transmission signal as radio waves. The transmission power of the transmission circuit 321 can be changed by the MCU 302. In the present embodiment, for example, the transmission circuit 321 can be switched to at least 2 transmission powers, the first transmission power and the second transmission power. For example, the first transmission power is a power that enables direct communication of a transmission signal to a sensor disposed at a close distance. For example, the second transmission power is a transmission power that is greater than the first transmission power and is a power that enables direct communication of a transmission signal to a collecting apparatus 101. The first transmission power and the second transmission power are determined based on the installation area 103 of the sensor nodes 102, a count of the sensor nodes 102 disposed, arrangement positions of the collecting apparatuses 101, and the like. Further, in the present embodiment, for example, transmission powers of the transmission circuit 321 are set so as to enable signals to travel a predetermined distance. Herein, the distance that radio waves can travel by the first transmission power is referred to as a first radio wave travel distance and the distance that radio waves can travel by the second transmission power of the transmission circuit 321 is referred to as a second radio wave travel distance.

The harvester 312 generates electrical power based on energy changes such as change in light, vibration, temperature, and radio waves in the external environment at the installation site of the sensor node 102. In the example depicted in FIG. 3, although a single harvester 312 is disposed, configuration is not limited hereto and, for example, the same type of harvester 312 may be disposed in plural, different types of the harvester 312 may be disposed, etc. The harvester 312 may generate electrical power according to a change detected by the sensor 301, may generate electrical power according to a change of reception radio waves received by the radio circuit 308, and the like. The battery 311 stores the electrical power generated by the harvester 312. In other words, the sensor node 102 internally generates electrical power required for operation, without the provision of a primary battery or an externa power source. The power management unit 310 controls the supply of the electrical power stored by the battery 311, as a driving power source of the components of the sensor node 102.

FIGS. 4A and 4B are diagrams depicting an example of assumed operation of the sensor nodes 102. Here, the sensor nodes 102 operate intermittently. Under intermittent operation, at predetermined intervals, the sensor nodes 102 activate from a sleep state. The predetermined interval is defined by the user. The sensor nodes 102, after activating, measure a state of the arrangement position using the sensor 301-1. Subsequently, the sensor nodes 102 transmit the obtained measurement values to the collecting apparatus 101. The sensor nodes 102, after transmitting the measurement values to the collecting apparatus 101, transition to a sleep state. Here, a state of activation is referred to as an activated state. Further, the activated state herein is the second state St2 depicted in FIG. 1. As depicted in FIG. 4A, under the activated state, processing by the MCU 302, transmission by the transmission circuit 321, reception by the reception circuit 322, etc. reduces the remaining power of the battery 311 in the sensor nodes 102. In contrast, during the sleep state, the remaining power of the battery 311 increases in the sensor nodes 102 consequent to charging.

As depicted in FIG. 4B, in the activated state, the sensor nodes 102 perform relayed transfer by multihop communication with respect to data signals that notify the collecting apparatuses 101 of measurement values obtained by the respective sensors 301. Further, as described above, in the activated state, the transmission power of the transmission circuits 321 of the sensor nodes 102 is assumed to be the first transmission power.

FIG. 5 is a block diagram of an example of hardware configuration of the server 201 and the collecting apparatus 101. Since the server 201 and the collecting apparatus 101 may have the same configuration, description will be given as such. Nonetheless, without limitation hereto, the server 201 and the collecting apparatus 101 may have differing configurations. To specify both the server 201 and the collecting apparatus 101, in FIG. 5, each will be referred to as simply an apparatus 500.

The apparatus 500, unlike the sensor nodes 102, operates based on an external power source. The apparatus 500 has a central processing unit (CPU) 501, timer 502, ROM 503, RAM 504, a disk drive 505, a disk 506, and an input/output (I/O) circuit 507. The apparatus 500 further has an internal bus 511 that connects the CPU 501, the timer 502, the ROM 503, the RAM 504, the disk drive 505, and the I/O circuit 507.

Here, the CPU 501 is a control unit that governs overall control of the apparatus 500. The ROM 503 is a storage unit that stores therein programs such as a boot program. The RAM 504 is a storage unit used as a work area of the CPU 501. The disk drive 505, under the control of the CPU 501, controls the reading and writing of data to the disk 506. The disk 506 is a storage unit that stores therein the data written thereto under the control of the disk drive 505. The disk 506 may be a magnetic disk, an optical disk, and the like. When the apparatus 500 is the server 201, a storage unit such as the ROM 503 and the disk 506 stores a collecting apparatus list 910 that is depicted in FIG. 9 and includes arrangement positions of the collecting apparatuses 101, identification information of each collecting apparatus 101, etc. Further, when the apparatus 500 is the server 201, a storage unit such as the ROM 503 and the disk 506 store the first radio wave travel distance r of radio waves by the first transmission power of the transmission circuit 321, the second radio wave travel distance R of radio waves by the second transmission power of the transmission circuit 321, etc.

The I/O circuit 507 is further connected to a wireless communications circuit 508 and an antenna 509. For example, when the apparatus 500 is the server 201, the apparatus 500 can wirelessly communicate with the collecting apparatuses 101 by wirelessly communicating with the gateway 202 via the wireless communications circuit 508 and the antenna 509. For example, when the apparatus 500 is the collecting apparatus 101, the apparatus 500 can wirelessly communicate with the sensor nodes 102 via the wireless communications circuit 508 and the antenna 509.

The I/O circuit 507 is further connected to a network I/F 510. Thus, the apparatus 500 can communicate with external devices through a network such as the Internet by a Transmission Control Protocol (TCP)/Internet Protocol (IP) process via the network I/F 510. In the communication by the network I/F 510, wired communication and wireless communication are applicable.

Although not depicted, the apparatus 500 may have an input device such as a keyboard, a mouse, and a touch panel whereby, the user can directly operate the apparatus 500 through input device. Further, for example, the apparatus 500 may have output device such as a display, a printer, and a buzzer. Thus, for example, when an abnormality occurs, the apparatus 500 may output indication that an abnormality has occurred, by the output device according to the type of abnormality.

Figures 6, 7:
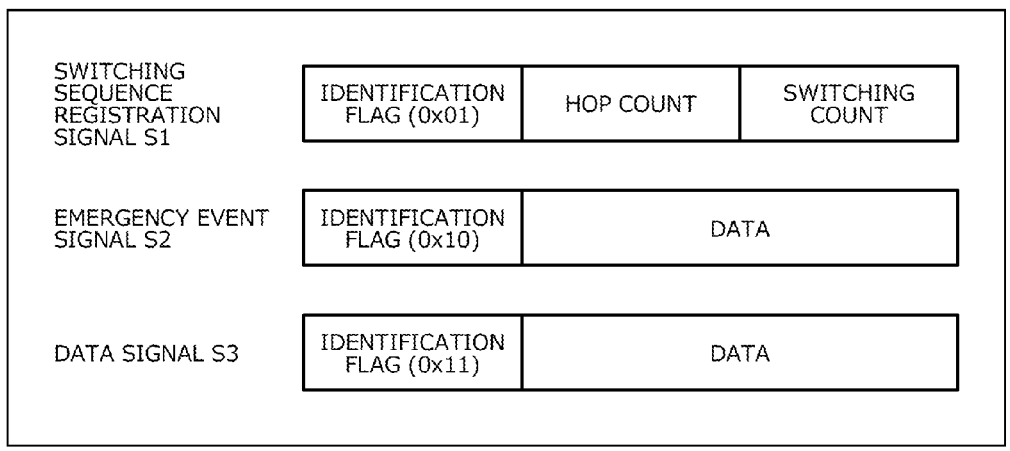
FIG. 6 is a diagram of examples of signal packet configurations.
FIG. 7 is a diagram depicting power states of components during various operations.

FIG. 6 is a diagram of examples of signal packet configurations. A switching sequence registration signal S1 is a signal to register the sequence in which the sensor nodes 102 are to supply power to the reception circuit 322 during the sleep state. The switching sequence registration signal S1 is relay transferred from the collecting apparatuses 101 to the sensor nodes 102 by multihop communication between the sensor nodes 102.

The switching sequence registration signal S1 has an identification flag, a hop count, and a switching count. The identification flag is information indicating that the signal is a switching sequence registration signal S1 and is a value that is predefined so as to not coincide with the identification flag of other signals. The identification flag, for example, is a fixed value such as 0x01. The hop count is the number of other sensor nodes 102 passed from the collecting apparatus 101 to the sensor node 102. The switching count is a number indicating how many times switching among the sensor nodes 102 is to occur during the measurement interval.

An emergency event signal S2 is a signal that notifies the collecting apparatuses 101 that an urgent abnormality has occurred. The emergency event signal S2 has an identification flag and data. The identification flag is information indicating that the signal is an emergency event signal S2 and is a value that is predefined so as to not coincide with the identification flag of other signals. For example, the identification flag is a fixed value such as 0x10. The data, for example, may be identification information of a sensor node 102 at which an abnormality occurred, an emergency event type, a measurement value, and the like. The emergency event type may be the type of the sensor 301. In the example described above, although the sensor 301-2 for emergency events is a single type, multiple types may be disposed and therefore, the type of the sensor 301 is included in the emergency event signal S2.

A data signal S3 is a signal that notifies the collecting apparatuses 101 of a measurement value. The data signal S3 has an identification flag and data. The identification flag is information indicating that the signal is a data signal S3 and is a value that is predefined so as to not coincide with the identification flag of other signals. For example, the identification flag is a fixed value such as 0x11. The data, for example, may be a measurement value, identification information of the sensor node 102 that measured the measurement value, and the like. Further, in FIG. 6, although one example of the respective signals is depicted, the signals are not limited hereto and various modifications are possible.

FIG. 7 is a diagram depicting power states of components during various operations. States of the sensor node 102 include an activated state, a surveillance state, and a sleep state. Here, the activated state is the second state St2 described above and depicted in FIG. 1; the surveillance state is the third state St3 depicted in FIG. 1; and the sleep state is the fourth state St4 depicted in FIG. 1. Further, power states of the MCU 302 include an ON state and a sleep state.

The ON state is a state in which voltage enabling various processes by the MCU 302 is supplied to the MCU 302. The sleep state is a state in which power is supplied to, for example, an interrupt circuit of the MCU 302 and the timer 303 and power is not supplied to circuits having a main function of the MCU 302 such as computation. Further, when the interrupt circuit of the MCU 302 receives an interrupt signal, the MCU 302 enters the ON state. Further, although the MCU 302 has an OFF state in which power supply is suspended to all components and all operation is disabled, the OFF state is not utilized in the present embodiment.

Power states of the reception circuit 322 include an ON state and an OFF state. The ON state is a state in which power is supplied to the reception circuit 322. The OFF state is a state in which power is not supplied to the reception circuit 322 and radio waves cannot be received. Power states of the sensor 301 include an ON state and an OFF state. The ON state is a state in which power is supplied to the sensor 301. The OFF state is a state in which power is not supplied to the sensor 301.

For example, when the sensor node 102 is in the activated state, the MCU 302 is in the ON state, the reception circuit 322 is in the ON state, the sensor 301-1 for periodic measurement is in the ON state, and the sensor 301-2 for emergency events is in the ON state.

For example, when the sensor node 102 is in the surveillance state, the MCU 302 is in the sleep state, the reception circuit 322 is in the ON state, the sensor 301-1 for periodic measurement is in the OFF state, and the sensor 301-2 for emergency events is in the ON state. For example, when the sensor node 102 is in the sleep state, the MCU 302 is in the sleep state, the reception circuit 322 is in the OFF state, the sensor 301-1 for periodic measurement is in the OFF state, and the sensor 301-2 for emergency events is in the ON state.

FIG. 8 is a diagram of an example of a functional configuration of the sensor node 102. The sensor node 102 has a control unit 801, a receiving unit 802, a transmitting unit 803, a power control unit 804, and a storage unit 805. The receiving unit 802 is implemented by the reception circuit 322. The transmitting unit 803 is implemented by the transmission circuit 321. The power control unit 804 is implemented by the power management unit 310. The storage unit 805, for example, is implemented by the ROM 304, the RAM 305, the non-volatile memory 306, and the like. The control unit 801, for example, is implemented by the MCU 302, the timer 303, and the like. Further, processes of the control unit 801, for example, are encoded in a program stored in the storage unit 805 that is accessed by the MCU 302. The MCU 302 reads the program from the storage unit 805 and executes a process encoded in the program. As a result, processes of the control unit 801 are implemented. Further, process results of the functional components, for example, are stored to the storage unit 805.

FIG. 9 is a diagram of an example of a functional configuration of the server 201. The server 201 has a control unit 901, a receiving unit 902, a transmitting unit 903, and a storage unit 904. The receiving unit 902 and the transmitting unit 903, for example, are implemented by the wireless communications circuit 508. The control unit 901 is implemented by the CPU 501, and the like. Further, processes of the control unit 901, for example, are encoded in a program stored in the storage unit 904 that is accessed by the CPU 501. The CPU 501 reads out the program from the storage unit 904 and executes a process encoded in the program. As a result, processes of the control unit 901 are implemented. Further, process results of the functional components, for example, are stored to the storage unit 904.

FIG. 10 is a diagram of an example of a functional configuration of the collecting apparatus 101. The collecting apparatus 101 has a control unit 1001, a receiving unit 1002, a transmitting unit 1003, and a storage unit 1004. The receiving unit 1002 and the transmitting unit 1003, for example, are implemented by the wireless communications circuit 508. The control unit 1001 is implemented by the CPU 501, and the like. Further, processes of the control unit 1001, for example, are encoded in a program stored in the storage unit 1004 that is accessed by the CPU 501. The CPU 501 reads out the program from the storage unit 1004 and executes a process encoded in the program. As a result, processes of the control unit 1001 are implemented. Further, process results of the functional components, for example, are stored to the storage unit 1004.

FIG. 11 is a diagram of an example of switching. For example, the sensor node 102, which is in the surveillance state is also called a surveillance node and the sensor node 102, which is in the sleep state is also called a sleep node. At time T (1) in FIG. 11, surveillance nodes include the sensor nodes 102-1 to 102-5. The surveillance nodes supply power to the reception circuit 322 and therefore, consume more power than sleep nodes. Thus, when a sensor node 102 is continuously a surveillance node, power of the battery 311 may become insufficient and therefore, switching between the surveillance state and the sleep state is performed. At time T' (2) in FIG. 11, surveillance nodes include the sensor nodes 102-6 to 102-10, and the sensor nodes 102-1 to 102-5 are sleep nodes.

In this manner, to implement a switching system of surveillance nodes during operation, the server 201, for example, determines at the start of operation, a switching count for switching the surveillance state and the sleep state. Based on the determined switching count, the server 201 determines a sequence in which the sensor nodes 102 are to be switched.

Figure 12A:
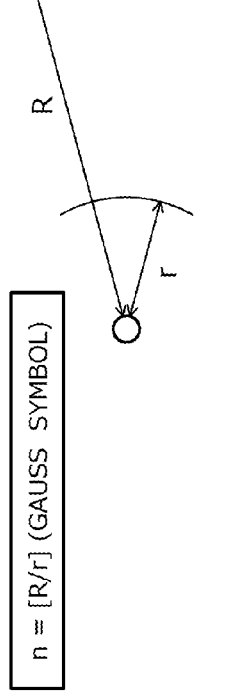
FIGS. 12A and 12B are diagrams depicting an example of switching count determination.
Figure 12B:
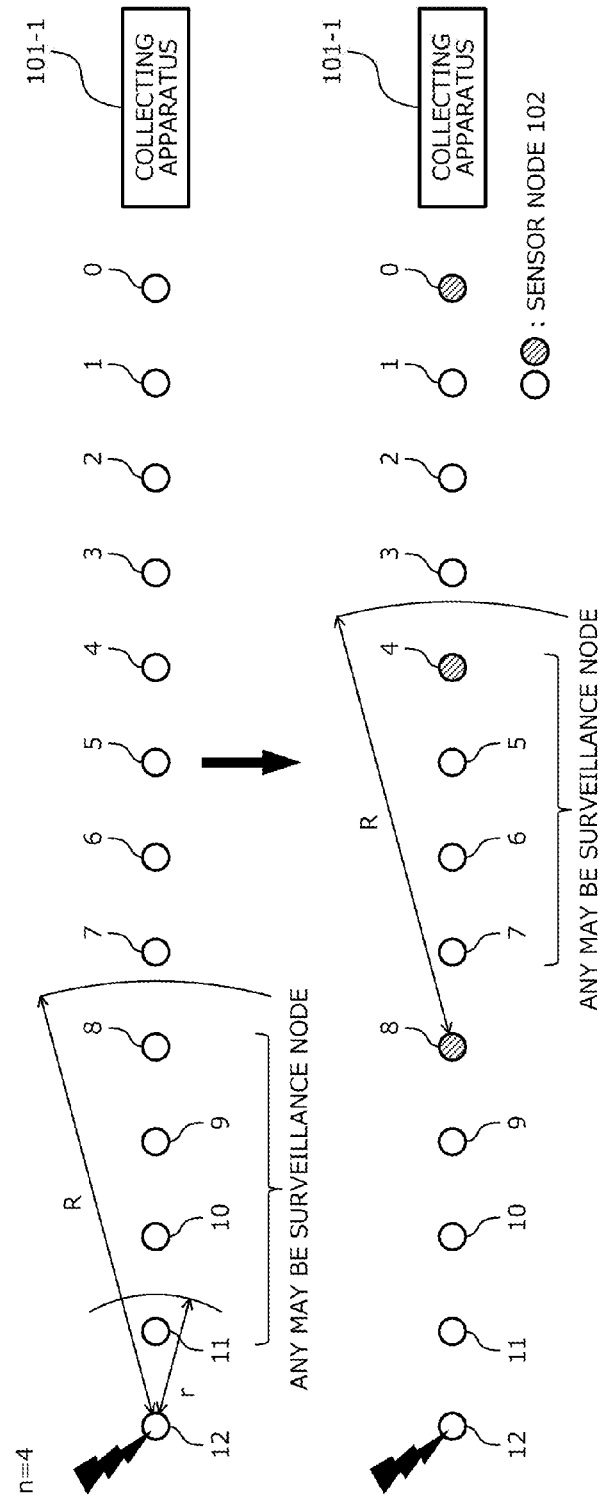

FIGS. 12A and 12B are diagrams depicting an example of switching count determination. The control unit 901 determines a switching count for switching the surveillance state and the sleep state. For example, as depicted in FIG. 12A, the control unit 901 determines the switching count n by a ratio of the first radio wave travel distance r to the second radio wave travel distance R. In the example depicted in FIGS. 12A and 12B, the switching count n is the greatest real number that does not exceed R/r ([ ] in FIG. 12A is a Gauss symbol). The control unit 901 stores the determined switching count n to the storage unit 904.

As depicted in FIG. 12B, when the switching count n is, for example, 4 and the sensor node 102-12 has transmitted a signal by a second transmission power p2, which is the maximum transmission power, the sensor nodes 102-8 to 102-11 are able to receive the signal. Therefore, among the sensor nodes 102-8 to 102-11, one may be a surveillance node. Further, when the sensor node 102-8 transmits a signal by the second transmission power p2, the sensor nodes 102-4 to 102-7 are able to receive the signal. Therefore, among the sensor nodes 102-4 to 102-7, one may be surveillance node.

Subsequently, the control unit 901 selects based on the collecting apparatus list 910, one collecting apparatus 101 from among the plural collecting apparatuses 101. The transmitting unit 903 transmits to the collecting apparatus 101 selected by the control unit 901, an instruction to transmit to the sensor nodes 102, a switching sequence registration signal that includes the switching count n. The collecting apparatus list 910, for example, includes arrangement positions of the collecting apparatuses 101, identification information of each collecting apparatus 101, etc.

Subsequently, the receiving unit 1002 receives the instruction from the transmitting unit 903. The control unit 1001, based on the instruction received by the receiving unit 1002, generates a switching sequence registration signal S1 in which the hop count is 0 and the switching count is n. The transmitting unit 1003 transmits the generated switching sequence registration signal S1 to the sensor nodes 102.

The receiving unit 802 receives the switching sequence registration signal S1. The control unit 801 calculates the remainder of the hop count included in the switching sequence registration signal S1 divided by the switching count n included in the switching sequence registration signal S1. The control unit 801 stores the calculated remainder as a serial position_d to the storage unit 805. The control unit 801 generates a switching sequence registration signal S1 in which the hop count has been incremented by 1. The transmitting unit 803 transmits the generated switching sequence registration signal S1.

FIG. 13 is a sequence diagram of an example of transfer of a switching sequence registration signal. As described, the server 201 transmits to a collecting apparatus 101, an instruction instructing the collecting apparatus 101 to cause the sensor nodes 102 to perform switching sequence registration (step S1301). The collecting apparatus 101, when receiving the instruction for switching sequence registration, transmits a switching sequence registration signal S1 to the sensor nodes 102 (step S1302). For example, the sensor node 102-0, when receiving the switching sequence registration signal S1, registers serial position_d based on the received switching sequence registration signal S1. Subsequently, for example, the sensor node 102-0 transfers the switching sequence registration signal S1 in which the hop count has been incremented by 1 (step S1303).

Similar to the sensor node 102-0, the sensor node 102-1, when receiving the switching sequence registration signal S1, registers serial position_d based on the received switching sequence registration signal S1. Subsequently, for example, the sensor node 102-1 transfers the switching sequence registration signal S1 in which the hop count has been incremented by 1 (step S1304). In this manner, the switching sequence registration signal S1 is transmitted to the sensor node 102-N by relayed transfer.

FIG. 14 is a diagram of an example of hop counts and registered serial positions. Here, description will be given taking as an example, a case where the switching count n is 4. For example, for the sensor node 102-0, the serial position_d is 0 since the hop count included in the switching sequence registration signal S1 is 0. For example, for the sensor node 102-1, the serial position_d is 1 since the hop count included in the switching sequence registration signal S1 is 1. For example, for the sensor node 102-2, the serial position_d is 2 since the hop count included in the switching sequence registration signal S1 is 2. For example, for the sensor node 102-3, the serial position_d is 3 since the hop count included in the switching sequence registration signal S1 is 3. For example, for the sensor node 102-4, the serial position_d is 0 since the hop count in the switching sequence registration signal S1 is 4.

Further, in the example depicted in FIG. 14, for the sensor nodes 102-4 and 102-8, the serial position_d is 0. For the sensor nodes 102-5 and 102-9, the serial position_d is 1. For the sensor nodes 102-6 and 102-10, the serial position_d is 2. For the sensor nodes 102-7 and 102-11, the serial position_d is 3.

Subsequently, during operation, the control unit 801 enters the activated state at measurement intervals measured by the timer 502 and performs periodic measurement by the sensor 301-1. The control unit 801 generates a data signal S3 that notifies the collecting apparatus 101 of the measurement value obtained by the sensor 301-1. The control unit 801 sets the transmission power of the transmitting unit 803 to a first transmission power p1. The transmitting unit 803 transmits the generated data signal S3 by the first transmission power p1.

Further, the receiving unit 802 receives from another sensor node 102 among the sensor nodes 102, a data signal S3 notifying the collecting apparatus 101 of the measurement value obtained by the other sensor node 102. The control unit 801 sets the transmission power of the transmitting unit 803 to the second transmission power p2. The transmitting unit 803 transfers the received data signal S3 by the second transmission power p2. Thus, as depicted in FIGS. 4A and 4B, data signals are relay transferred to the collecting apparatus 101 by multihop communication among the sensor nodes 102.

Subsequently, after completing the periodic measurement, the control unit 801 sets the measurement interval and a surveillance period in the timer 502. The control unit 801 instructs the power control unit 804 to transition the sensor node 102 from the activated state to the sleep state. The power control unit 804 performs control to reduce the source voltage supplied to the MCU 302 to transition the sensor node 102 to the sleep state. Further, the power control unit 804 performs control such that power supply to the reception circuit 322 and the sensor 301-1 for periodic measurement ceases. However, power continues to be supplied to the sensor 301-2 for emergency events.

Further, immediately before transitioning from the activated state to the sleep state, the control unit 801 may set the transmission power of the transmitting unit 803 to the second transmission power p2. As a result, when the sensor node 102 is in the surveillance state, the transmitting unit 803 can transmit an emergency event signal S2 by the second transmission power p2, which is the maximum transmission power, even when the control unit 801 is in the sleep state.

Further, when a surveillance start time arrives according to the timer 303, the power control unit 804 supplies power to the reception circuit 322, to transition the sensor node 102 from the sleep state to the surveillance state. During the surveillance state, if the receiving unit 802 receives an emergency event signal S2, the transmitting unit 803 transmits the received emergency event signal S2 by the second transmission power p2.

When a surveillance end time arrives according to the timer 303, the power control unit 804 ceases power supply to the reception circuit 322, to transition the sensor node 102 from the surveillance state to the sleep state.

Further, during operation, the surveillance start time when the sensor node 102 becomes a surveillance node is determined by equation (1); the surveillance end time when the sensor node 102 transitions from a surveillance node to a sleep node is determined by equation (2); and the surveillance period is determined by equation (3).

$$\text{surveillance start time } TS=i \text{ after periodic measurement} \times d \text{ seconds later} \qquad (1)$$

$$\text{surveillance end time } TE=i \text{ after periodic measurement} \times (d+1) \text{seconds later} \qquad (2)$$

$$\text{measurement interval}=I$$

$$\text{surveillance period}=i=I/n \qquad (3)$$

A measurement interval I is the same as the interval I of the first state St1 depicted in FIG. 1 and a surveillance period i is the same as the partial interval i depicted in FIG. 1.

FIG. 15 is a diagram of periodic measurement and the surveillance period. The sensor nodes 102, after synchronously performing periodic measurement, measure the measurement interval I by the timer 303 and measure the surveillance start time and the surveillance end time by the timer 303.

The sensor nodes 102-0 and 102-4 whose serial position_d is 0 transition from the activated state to the surveillance state when the surveillance start time TS0 arrives, and enter the sleep state when the surveillance end time TE0 arrives. Further, during an interval from the surveillance start time TS0 until the surveillance end time TE0, the sensor nodes 102-1 to 102-3, and 102-N whose serial position_d is 1, 2, or 3 are in the sleep state.

The sensor node 102-1 whose serial position_d is 1 transitions from the sleep state to the surveillance state when the surveillance start time TS1 arrives, and transitions from the surveillance state to the sleep state when the surveillance end time TE1 arrives. Further, during an interval from the surveillance start time TS1 until the surveillance end time TE1, the sensor nodes 102-0, 102-2 to 102-4, and 102-N whose serial position_d is 0, 2, or 3 are in the sleep state.

The sensor node 102-2 whose serial position_d is 2 transitions from the sleep state to the surveillance state when the surveillance start time TS2 arrives, and transitions from the surveillance state to the sleep state when the surveillance end time TE2 arrives. Further, during an interval from the surveillance start time TS2 until the surveillance end time TE2, the sensor nodes 102-0, 102-1, 102-3, 102-4, and 102-N whose serial position_d is 0, 1, or 3 are in the sleep state.

The sensor nodes 102-3 and 102-N whose serial position_d is 3, transition from the sleep state to the surveillance state when the surveillance start time TS3 arrives, and transition from the surveillance state to the activated state when the surveillance end time TE3 arrives. Transition to the activated state after the surveillance state is consequent to completion of the measurement of the measurement interval I by the timer 303. Further, during an interval from the surveillance start time TS3 until the surveillance end time TE3, the sensor nodes 102-0 to 102-2, and 102-4 whose serial position_d is 0, 1, or 2 are in the sleep state.

FIG. 16 is a diagram of a transition example of a surveillance node after periodic measurement. In the example depicted in FIG. 16, the switching count n is assumed to be 4 and the collecting apparatus 101-3 is assumed to have transmitted a switching sequence registration signal S1. In FIG. 16, (1) depicts surveillance nodes during an interval 0 seconds to i seconds after periodic measurement is performed; (2) depicts surveillance nodes during an interval i seconds to 2i seconds after periodic measurement is performed; (3) depicts surveillance nodes during an interval 2i seconds to 3i seconds after periodic measurement is performed; and (4) depicts surveillance nodes during an interval 3i seconds to 4i seconds after periodic measurement is performed.

Figure 17:
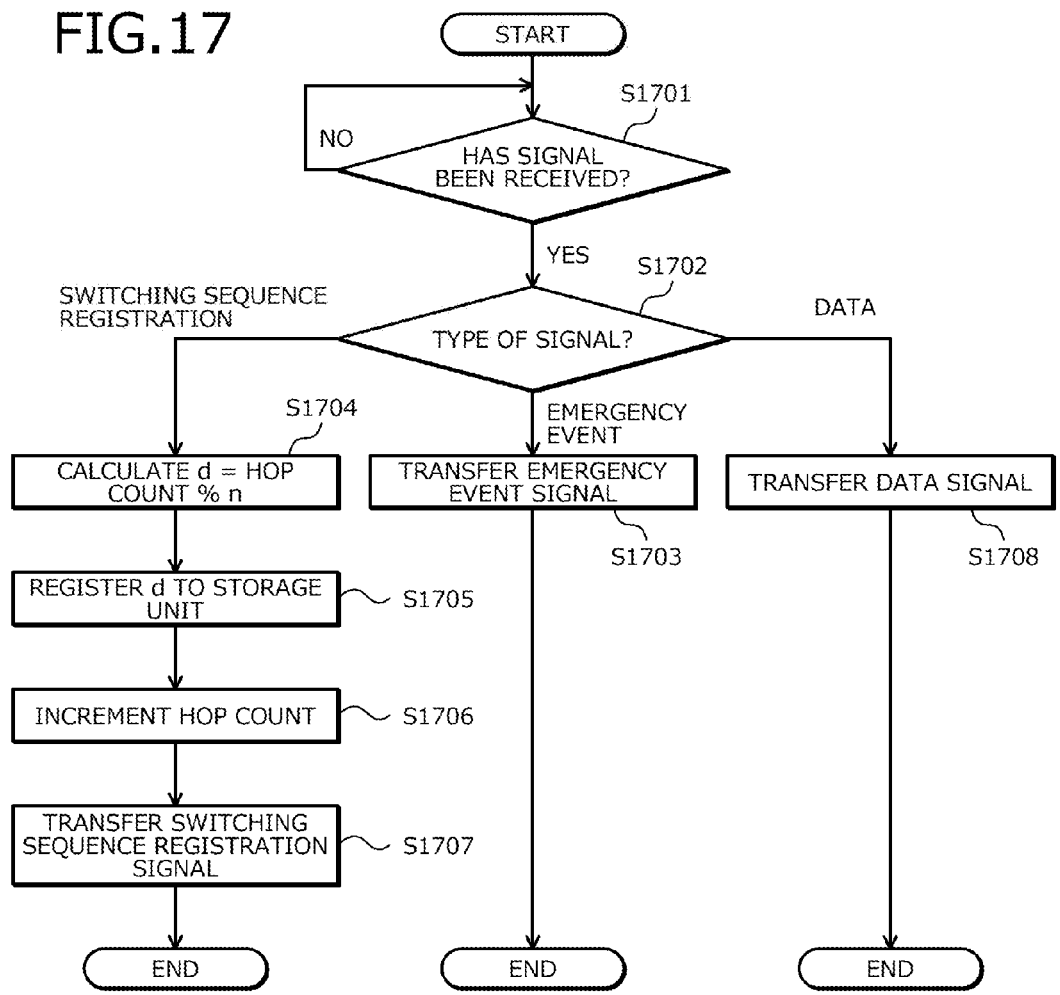
FIG. 17 is a flowchart of an example of a process procedure performed by the sensor node 102 when receiving a signal.

FIG. 17 is a flowchart of an example of a process procedure performed by the sensor node 102 when receiving a signal. The sensor node 102 determines whether a signal has been received (step S1701). If no signal has been received (step S1701: NO), the sensor node 102 returns to step S1701.

If a signal has been received (step S1701: YES), the sensor node 102 determines the type of signal received (step S1702). If the received signal is an emergency event signal (step S1702: emergency event), the sensor node 102 transfers the emergency event signal S2 by the second transmission power p2 (step S1703), ending the series of operations.

If the received signal is a switching sequence registration signal S1 (step S1702: switching sequence registration), the sensor node 102 calculates serial position_d=hop count % n included in the received switching sequence registration signal S1 (step S1704). "%" represents the remainder resulting from algebraic division. Subsequently, the sensor node 102 registers the serial position_d to the storage unit 805 (step S1705). The sensor node 102 increments the hop count (step S1706), and transfers by the first transmission power p1, the switching sequence registration signal S1 in which the hop count has been incremented (step S1707), ending the series of operations.

Further, if the received signal is a data signal S3 (step S1702: data), the sensor node 102 transfers the data signal S3 by the first transmission power p1 (step S1708), ending the series of operations.

Figure 18:
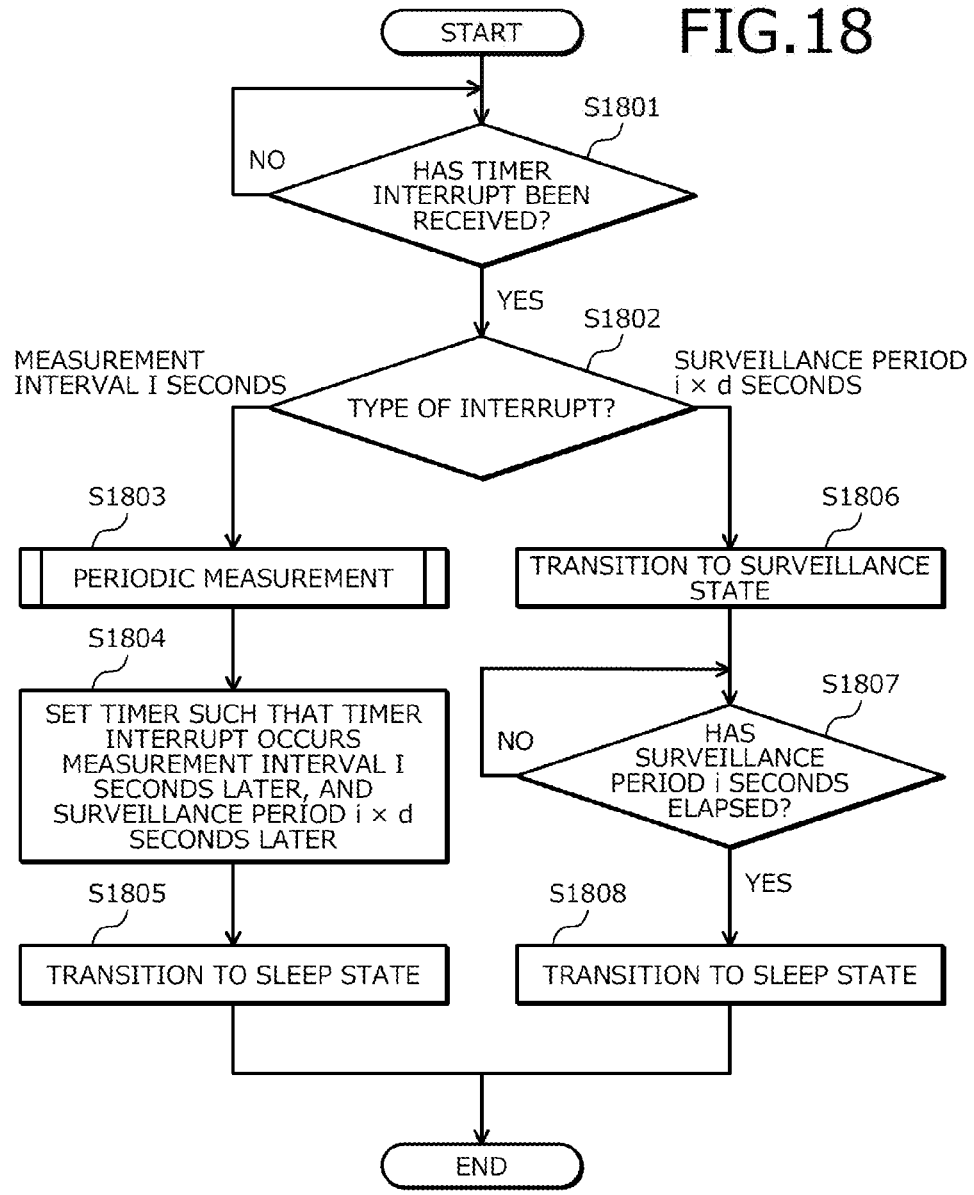
FIG. 18 is a flowchart of an example of a process procedure performed by the sensor node 102 in a case of a timer interrupt.

FIG. 18 is a flowchart of an example of a process procedure performed by the sensor node 102 in the case of a timer interrupt. The sensor node 102 determines whether a timer interrupt has been received (step S1801). If no timer interrupt has been received (step S1801: NO), the sensor node 102 returns to step S1801.

If a timer interrupt has been received (step S1801: YES), the sensor node 102 determines the type of timer interrupt received (step S1802). If the received timer interrupt is a timer interrupt consequent to measurement of the measurement interval I (step S1802: measurement interval I seconds), the sensor node 102 enters the activated state by supplying power to the MCU 302 and performs periodic measurement (step S1803). In the periodic measurement, measurement by the sensor 301, transmission (by the first transmission power p1) of a data signal that includes the measurement value, synchronous processing with other sensor nodes 102, for example, are performed. For example, synchronous processing represents transitioning to the sleep state or the surveillance state after a predetermined period from the start of measurement has elapsed. Variance in data signal transmission occurs consequent to the measurement interval being measured by the sensor nodes 102. Therefore, the predetermined period that elapses is estimated so that from the measurement start time, data signal transmission by the sensor nodes 102 is completed. Therefore, by performing synchronous processing, more data signals are able to reach the collecting apparatus 101.

The sensor node 102 sets the timer 303 such that a timer interrupt occurs the measurement interval I seconds later, and the surveillance period i×d seconds later (step S1804). The sensor node 102 suspends power supply to the reception circuit 322 and reduces the source voltage to the MCU 302 and thereby, transitions to the sleep state (step S1805), ending the series of operations.

Further, if the received timer interrupt is a timer interrupt consequent to measurement of the surveillance period (step S1802: surveillance period i×d seconds), the sensor node 102 transitions to the surveillance state by supplying power to the reception circuit 322 (step S1806). Subsequently, the sensor node 102 determines whether the surveillance period i seconds has elapsed (step S1807). If the surveillance period i seconds has not elapsed (step S1807: NO), the sensor node 102 returns to step S1807.

If the surveillance period i seconds has elapsed (step S1807: YES), the sensor node 102 transitions to the sleep state by suspending power supply to the reception circuit 322 (step S1808), ending the series of operations.

FIG. 19 is a flowchart of an example of a process procedure performed by the sensor node 102 when an emergency event occurs. The sensor node 102 determines whether an interrupt signal has been received from the sensor 301 (step S1901). If no interrupt signal has been received (step S1901: NO), the sensor node 102 returns to step S1901.

If an interrupt signal has been received (step S1901: YES), the sensor node 102 obtains the measurement value from the sensor 301 (step S1902). The sensor node 102 transmits an emergency event signal that has the type of the sensor 301 and/or the obtained measurement value (step S1903). The sensor node 102 transitions to the sleep state (step S1904), ending the series of operations.

FIG. 20 is a flowchart of an example of a process procedure performed by the server 201. The server 201 calculates the switching count n (step S2001). The server 201 selects one collecting apparatus 101 and instructs the selected collecting apparatus 101 to perform switching sequence registration (step S2002). Subsequently, the server 201 performs periodic measurement (step S2003). In the periodic measurement, the server 201 observes the state of the installation area 103, based on collected measurement values of the sensor nodes 102.

Subsequently, the server 201 determines whether an emergency event has occurred (step S2004). If an emergency event has occurred (step S2004: YES), the server 201 processes the emergency event (step S2005), and transitions to step S2006.

If no emergency event has occurred (step S2004: NO), the server 201 determines whether a predetermined period has elapsed (step S2006). The predetermined period is the measurement interval I described above. For example, the server 201 may measure the measurement interval I by the timer 502. If the predetermined period has not elapsed (step S2006: NO), the server 201 returns to step S2004. On the other hand, if the predetermined period has elapsed (step S2006: YES), the server 201 returns to step S2003.

FIG. 21 is a flowchart of an example of a process procedure performed by the collecting apparatus 101. The collecting apparatus 101 determines whether a signal has been received (step S2101). If no signal has been received (step S2101: NO), the collecting apparatus 101 returns to step S2101. On the other hand, if an emergency event signal has been received (step S2101: emergency event), the collecting apparatus 101 notifies the server 201 of the emergency event (step S2102), ending the series of operations.

Further, if the collecting apparatus 101 determines that a switching sequence registration signal has been received (step S2101: switching sequence registration), the collecting apparatus 101 sets the hop count to 0, sets the switching count to n, and transmits a switching sequence registration signal (step S2103), ending the series operations.

As described, for example, when sensor nodes are operated intermittently, to enable the sensor nodes 102 to give notification of a detected abnormality even during an idle period, reception circuits of the sensor nodes 102 are in operation during the idle period and consequently power consumption becomes great. Therefore, for example, even when charging is performed during the idle period, the battery level at the next activation may be insufficient. Thus, in the system 100 according to the present embodiment, during a periodic charging interval, the operation state and idle state of the reception circuit are alternated for each sensor node 102 and the portion of sensor nodes 102 that are in the operation state transfer abnormality notification signals. As a result, power consumption is suppressed and abnormality notification can be performed during the charging interval. The operation state is the surveillance state described above.

Further, the sensor nodes 102 transmit data signals by the first transmission power. The sensor nodes 102 further transmit abnormality notification signals by the second transmission power p2, which is greater than the first transmission power. As a result, even when there are fewer operating sensor nodes 102, abnormality notification signals can be transmitted farther and therefore, abnormality notification signals can reach the collecting apparatus 101 by fewer transfers.

Further, the length of the interval of the operation state of the reception circuit and the length of the interval of the idle state of the reception circuit are values corresponding to the second rate of the emergency event signal travel distance by the second transmission power p2 and the data signal travel distance by the first transmission power. As a result, since the operation state of the reception circuit of the sensor nodes 102 is a shorter interval, power consumption can be reduced.

Further, each sensor node 102, before operation, determines the start time of the partial interval by the hop count for a signal transmitted from the collecting apparatus 101 to reach the sensor node 102. As a result, abnormality notification signals reach the collecting apparatus 101 with greater precision.

The switching method described in the present embodiment may be implemented by executing a prepared program on the MCU 302. The program is stored to a recording medium readable by the MCU 302 such as the ROM 304 and the non-volatile memory 306, and is executed by being read out from the recording medium by the MCU 302. Further, the program may be distributed by the server via the collecting apparatus.

According to one aspect of the present invention, reductions in power consumption can be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A system comprising:
a communications apparatus; and
a plurality of communications nodes that synchronously switch between a first state and a second state, when a first communications node among the plurality of communications nodes is in the first state and an abnormality occurs at the first communications node, the first communications node transmits to the communications apparatus, a first abnormality notification signal that gives notification that the abnormality occurred, and when in the second state, the first communications node transmits to the communications apparatus, a data signal that differs from the first abnormality notification signal, wherein the first communications node, during each interval of the first state:
  enters a third state during a first partial interval that is included in the interval of the first state, the first communications node when in the third state, receives a second abnormality notification signal transmitted from a second communications node among the plurality of communications nodes and transfers the second abnormality notification signal, and
  enters a fourth state during a second partial interval that differs from the first partial interval and is included in the interval of the first state, the first communications node when in the fourth state, refrains from receiving the second abnormality notification signal.

2. The system according to claim 1, wherein
the first communications node transmits the first and the second abnormality notification signals by a transmission power that is greater than a transmission by which the first communications node transmits the data signal.

3. The system according to claim 2, wherein
a first rate of a length of the first partial interval and a length of the second partial interval is a value that corresponds to a second rate of an abnormality notification signal travel distance and a data signal travel distance.

4. The system according to claim 3, wherein
the first communications node determines a start time of the first partial interval by the first rate and a hop count for a signal transmitted from the communications apparatus to reach the first communications node.

5. The system according to claim 1, wherein
the plurality of communications nodes respectively have a sensor, and
the first communications node transmits to the communications apparatus, the data signal that has data of the sensor of the first communications node.

6. A communications node comprising:
a transmitting circuit; and
a receiving circuit, wherein
the communications node is among a plurality of communications nodes that synchronously switch between a first state and a second state,
the communications node, when in the first state and an abnormality occurs at the communications node, transmits to a communications apparatus, a first abnormality notification signal that gives notification that the abnormality occurred, and when in the second state, the communications node transmits to the communications apparatus, a data signal that differs from the first abnormality signal,
the communications node, during each interval of the first state:
  enters a third state during a first partial interval that is included in the interval of the first state, the communications node when in the third state, receives by the receiving circuit, a second abnormality notification signal transmitted from a second communications node among the plurality of communications nodes and transfers the second abnormality notification signal by the transmitting circuit, and
  enters a fourth state during a second partial interval that differs from the first partial interval and is included in the interval of the first state, the communications node when in the fourth state, refrains from receiving the second abnormality notification signal.

7. The communications node according claim 6, wherein
the communications node, during the interval of the first state, enters the third state by supplying power to the receiving circuit and enters the fourth state by suspending power supply to the receiving circuit.

8. A switching method of a communications node, the method comprising:
synchronous switching between a first state and a second state by the communications node, the communications node synchronously switching with a plurality of communications nodes;
transmitting a first abnormality notification signal to a communications apparatus by the communications node when in the first state and an abnormality occurs at the communications node, the first abnormality notification signal giving notification that the abnormality occurred;
transmitting a data signal to the communications apparatus by the communications node when in the second state, the data signal differing from the first abnormality notification signal;
receiving and transferring by the communications node when in a third state, a second abnormality notification signal transmitted from a second communications node among the plurality of communications node, the communications node being in the third state during a first partial interval that is included in an interval of the first state; and
refraining from receiving the second abnormality notification signal by the communications node when in a fourth state, the communications node being in the fourth state during a second partial interval that differs from the first partial interval and is included in the interval of the first state.

* * * * *